US011920372B2

(12) United States Patent
Uyeda

(10) Patent No.: US 11,920,372 B2
(45) Date of Patent: Mar. 5, 2024

(54) SEALING OF AN ELECTRONIC LOCK

(71) Applicant: ASSA ABLOY Americas Residential Inc., New Haven, CT (US)

(72) Inventor: Alan Uyeda, Irvine, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 431 days.

(21) Appl. No.: 17/100,083

(22) Filed: Nov. 20, 2020

(65) Prior Publication Data

US 2021/0159634 A1 May 27, 2021

Related U.S. Application Data

(60) Provisional application No. 63/069,888, filed on Aug. 25, 2020, provisional application No. 62/939,406, filed on Nov. 22, 2019.

(51) Int. Cl.
*E05B 47/00* (2006.01)
*E05B 17/00* (2006.01)
(Continued)

(52) U.S. Cl.
CPC ............ *E05B 17/002* (2013.01); *E05B 17/10* (2013.01); *E05B 17/14* (2013.01);
(Continued)

(58) Field of Classification Search
CPC .............. H01R 13/5205; H01R 13/521; H01R 13/5219; E05B 2047/0048;
(Continued)

(56) References Cited

U.S. PATENT DOCUMENTS 4,148,542 A * 4/1979 Wood ..................... H02B 1/044 439/546
5,295,865 A * 3/1994 Endo .................... H01R 43/005 439/271
(Continued)

FOREIGN PATENT DOCUMENTS

CA 2693713 C * 12/2011 ......... H01R 13/6315
CN 106252971 A * 12/2016
(Continued)

OTHER PUBLICATIONS

PCT International Search Report and Written Opinion in International Application PCT/US2020/061245, dated Mar. 2, 2021, 13 pages.
(Continued)

*Primary Examiner* — Carlos Lugo
(74) *Attorney, Agent, or Firm* — Merchant & Gould P.C.

(57) ABSTRACT

A mounting plate for an electronic lock includes a main body and a wiring harness electrical receptacle configured to connect to a wiring harness. The mounting plate includes a wiring harness receiving port that is defined in the main body and axially aligned with the wiring harness electrical receptacle. The wiring harness receiving port includes a first portion sized and shaped to seal around the wiring harness and a second portion sized and shaped to axially limit movement of the wiring harness therein.

19 Claims, 24 Drawing Sheets

(51) Int. Cl.

| | |
|---|---|
| ***E05B 17/10*** | (2006.01) |
| ***E05B 17/14*** | (2006.01) |
| ***E05B 49/00*** | (2006.01) |
| ***H01R 13/52*** | (2006.01) |

(52) U.S. Cl.
CPC .......... *E05B 47/0001* (2013.01); *E05B 49/00* (2013.01); *H01R 13/5205* (2013.01); *E05B 2047/0056* (2013.01); *E05B 2047/0072* (2013.01); *E05Y 2400/612* (2013.01); *E05Y 2400/66* (2013.01); *E05Y 2400/86* (2013.01); *E05Y 2900/132* (2013.01)

(58) Field of Classification Search
CPC ..... E05B 2047/0071; E05B 2047/0084; E05B 2047/0088; E05B 2047/0091; E05B 49/00
See application file for complete search history.

(56) References Cited

U.S. PATENT DOCUMENTS

| | | | | |
|---|---|---|---|---|
| 5,927,725 | A * | 7/1999 | Tabata | H01R 13/5205 174/152 G |
| 6,083,040 | A * | 7/2000 | Mosquera | H01R 13/74 439/548 |
| 6,116,066 | A * | 9/2000 | Gartner | E05B 47/0673 70/432 |
| 6,773,282 | B2 * | 8/2004 | Alvey | H01R 29/00 439/13 |
| 7,029,328 | B1 * | 4/2006 | Mckenzie | H01R 13/5221 439/587 |
| 7,357,669 | B2 * | 4/2008 | Gabet | H01R 13/74 439/549 |
| 7,540,768 | B1 * | 6/2009 | Wang | H01R 13/743 439/536 |
| 7,641,487 | B2 * | 1/2010 | Morgan | H01R 13/523 439/158 |
| 9,024,759 | B2 | 5/2015 | Uyeda et al. | |
| 9,413,099 | B2 * | 8/2016 | Vanslambrouck | H01R 13/5202 |
| 9,422,746 | B1 * | 8/2016 | Zhang | E05B 47/06 |
| 9,424,700 | B2 | 8/2016 | Lovett et al. | |
| 9,562,370 | B2 * | 2/2017 | Ohl | E05B 63/10 |
| 9,670,696 | B2 * | 6/2017 | Chong | G07C 9/00174 |
| 9,758,991 | B2 * | 9/2017 | Lin | E05B 47/00 |
| 10,033,972 | B2 | 7/2018 | Almomani et al. | |
| 10,208,508 | B2 * | 2/2019 | Tien | G07C 9/00563 |
| 10,388,428 | B2 * | 8/2019 | Nakashima | H01B 7/0045 |
| 10,411,396 | B2 * | 9/2019 | Itani | H01R 43/18 |
| 10,508,469 | B2 | 12/2019 | Wong | |
| 10,808,420 | B2 | 10/2020 | Morstatt et al. | |
| 11,443,572 | B2 | 9/2022 | Kusanale et al. | |
| 11,450,158 | B2 * | 9/2022 | Chong | E05B 47/026 |
| 2006/0144103 | A1 | 7/2006 | Blanch | |
| 2009/0042422 | A1 | 2/2009 | Morgan | |
| 2010/0257906 | A1 | 10/2010 | Sorensen et al. | |
| 2014/0165673 | A1 | 6/2014 | Tyner et al. | |
| 2014/0250956 | A1 | 9/2014 | Chong | |
| 2019/0115685 | A1 * | 4/2019 | Cairns | H02G 15/013 |
| 2019/0213818 | A1 | 7/2019 | Einberg | |
| 2020/0402741 | A1 | 12/2020 | Huang | |
| 2021/0156169 | A1 | 5/2021 | Uyeda | |

FOREIGN PATENT DOCUMENTS

| | | | | |
|---|---|---|---|---|
| DE | 202014007116 U1 * | 1/2016 | H01R 13/6271 |
| JP | H11233206 A * | 8/1999 | |
| KR | 101461504 B1 * | 11/2014 | |
| KR | 10-2017-0093627 | 8/2017 | |
| WO | WO-2013022119 A1 * | 2/2013 | H01R 13/405 |
| WO | WO-2013076521 A1 * | 5/2013 | H01R 13/443 |

OTHER PUBLICATIONS

PCT International Preliminary Report on Patentability in International Application PCT/US2020/061245, dated Jun. 2, 2022, 10 pages.

* cited by examiner

SEALING OF AN ELECTRONIC LOCK

This application claims the benefit of U.S. Provisional Application Ser. No. 62/939,406, filed Nov. 22, 2019; and U.S. Provisional Application Ser. No. 63/069,888, filed Aug. 25, 2020, the disclosures of which are hereby incorporated by reference in their entireties.

BACKGROUND

Weather conditions can damage an electronic lock, specifically any electronics and the wiring harness. Therefore, the electronic lock can become inoperable if improperly protected from the weather. Further, the electronic lock needs to withstand regular user input while remaining sealed to the elements.

Typical electronic door locks require a wiring harness to pass from the exterior of the mounted-to door to the interior of the mounted-to door. Wired communication between the exterior and interior of the lock is often required for the unlocking and locking function. This is due to the fact that both a power source and a processor are typically mounted within the interior portion of the electronic door lock. Accidental disconnection of the wiring harness from either the interior or exterior assembly of the lock prevents the assemblies from communicating, therefore rendering the electronic lock inoperable.

Therefore, improvements are desired.

SUMMARY

The present disclosure is directed to an electronic lock. In certain examples, aspects of the present disclosure relate specifically to sealing of an electronic lock.

One aspect of the present disclosure relates to an electronic lock. The electronic lock includes an exterior assembly and an interior assembly. The electronic lock includes a wiring harness connectable to the exterior and interior assemblies to allow communication therebetween. The wiring harness includes a seal therearound. The exterior assembly includes a wiring harness electrical receptacle that is configured to connect to the wiring harness having a first orientation. The exterior assembly includes a wiring harness receiving port that is aligned with the wiring harness electrical receptacle. The wiring harness receiving port includes a first portion sized and shaped to position the seal of the wiring harness between walls of the first portion and the wiring harness. The wiring harness receiving port includes a second portion that includes port barriers sized and shaped to allow for the wiring harness to pass through the second portion when the wiring harness is in a first orientation. The port barriers of the second portion limit axial movement of the wiring harness through the second portion when the wiring harness is in a second orientation.

Another aspect of the present disclosure relates to a mounting plate for use in an electronic lock. The mounting plate includes a main body and a wiring harness electrical receptacle configured to connect to a wiring harness. The mounting plate includes a wiring harness receiving port that is defined in the main body and axially aligned with the wiring harness electrical receptacle. The wiring harness receiving port includes a first portion sized and shaped to seal around the wiring harness and a second portion sized and shaped to axially limit the movement of the wiring harness therein.

Another aspect of the present disclosure relates to another electronic lock. The electronic lock includes an exterior assembly positioned at an exterior of a door. The electronic lock includes an interior assembly that has a power source and a processor. The electronic lock includes a bolt movable between an extended position and a retracted position. The exterior assembly and the interior assembly are connected to, and capable of actuating, the bolt. The electronic lock includes a wiring harness that is connectable to the exterior and interior assemblies to allow communication therebetween. The exterior assembly includes a first authentication source to selectively actuate the bolt. The first authentication source is a biometric fingerprint sensor. The biometric fingerprint sensor is connected to the processor of the interior assembly via the wiring harness to selectively actuate the bolt when a valid credential is received at the biometric fingerprint sensor. The exterior assembly includes a second authentication source that is at least one of a mechanical lock, a keypad, a touch surface, and a NFC reader.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
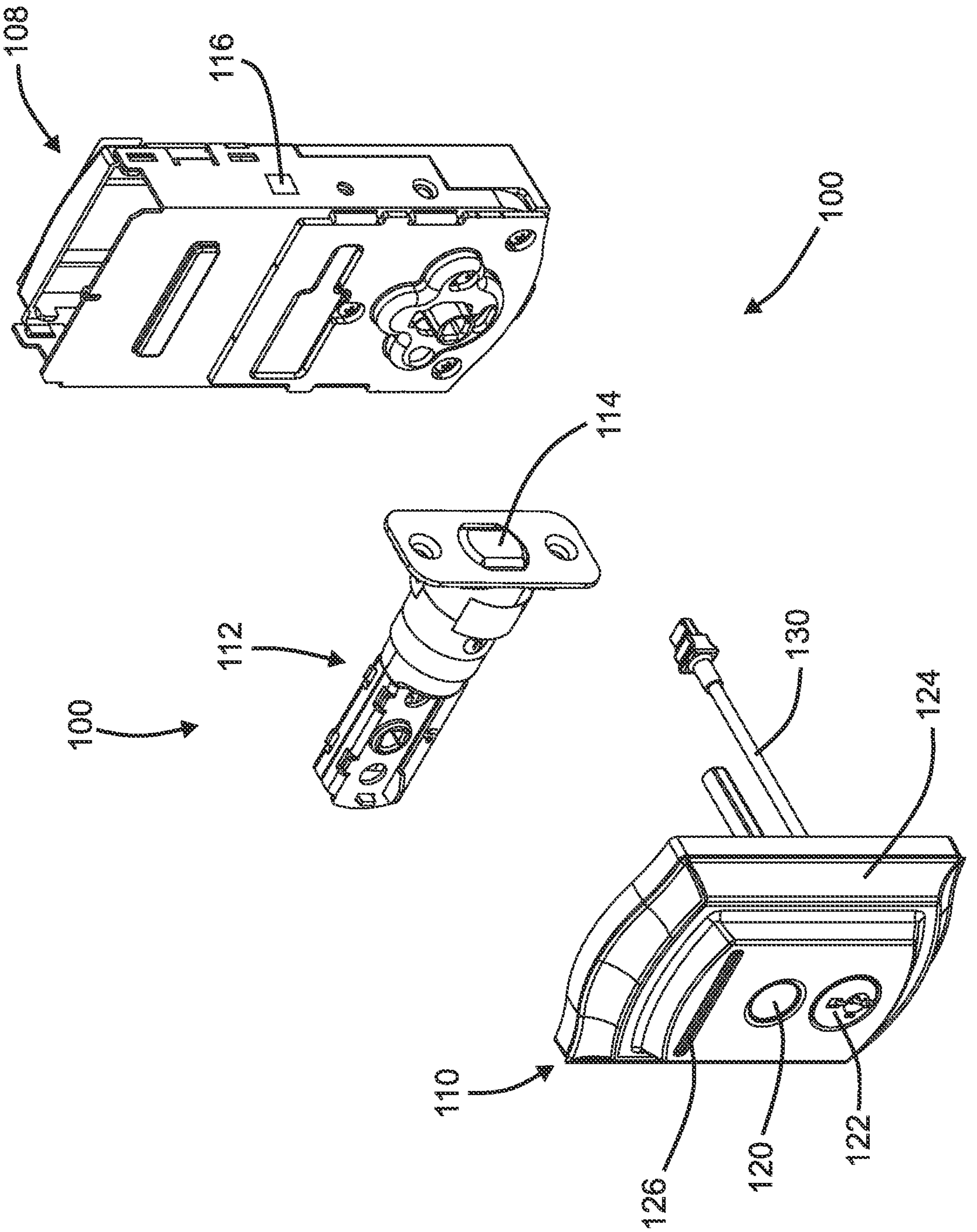
FIG. 1 is a perspective view of an electronic lock, according to one example of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

This disclosure generally relates to an electromechanical lock with certain features. The term "electronic lock" is broadly intended to include any type of lockset that uses electrical power in some manner, including but not limited to, electronic deadbolts, electronic lever sets, etc. This disclosure encompasses the integration of one or more features described herein into any type of electronic lock and is not intended to be limited to any particular type of electronic lock.

Further, this disclosure relates generally to a biometric electronic lock that, based on the biometric data received, is configured to perform a plurality of operations. Biometric data may be fingerprint data, which is used as an example throughout, although other types of biometric data are contemplated. In an example embodiment, if the biometric data received, for example fingerprint data, is a known and authorized user, the electronic lock actuates the locking bolt to unlock the electronic lock. If the fingerprint data received is not a known user, the electronic lock does not actuate the locking bolt.

FIG. 1. shows an electronic lock 100, according to one example of the present disclosure. FIGS. 2-5 illustrate the electronic lock 100 mounted to a door 102. The electronic lock 100 includes an interior assembly 108, an exterior assembly 110, and a latch assembly 112. The door has an interior side 104 and an exterior side 106.

In some examples, the interior assembly 108 is mounted to the interior side 104 of the door 102, and the exterior assembly 110 is mounted to the exterior side 106 of the door 102. The latch assembly 112 is typically at least partially mounted in a bore formed in the door 102. The term "outside" is broadly used to mean an area outside the door 102 and "inside" is broadly used to denote an area inside the door 102. With an exterior entry door, for example, the exterior assembly 110 may be mounted outside a building, while the interior assembly 108 may be mounted inside a building. With an interior door, the exterior assembly 110 may be mounted inside a building, but outside a room secured by the lock 100, and the interior assembly 108 may be mounted inside the secured room. The lock 100 is applicable to both interior and exterior doors.

The interior assembly 108 can include a processing unit 116 (shown schematically) containing electronic circuitry for the electronic lock 100. In some examples, the interior assembly 108 includes a manual turnpiece 118 that can be used on the interior side 104 of door 102 to move a bolt 114 between the extended and retracted positions.

Figure 2:
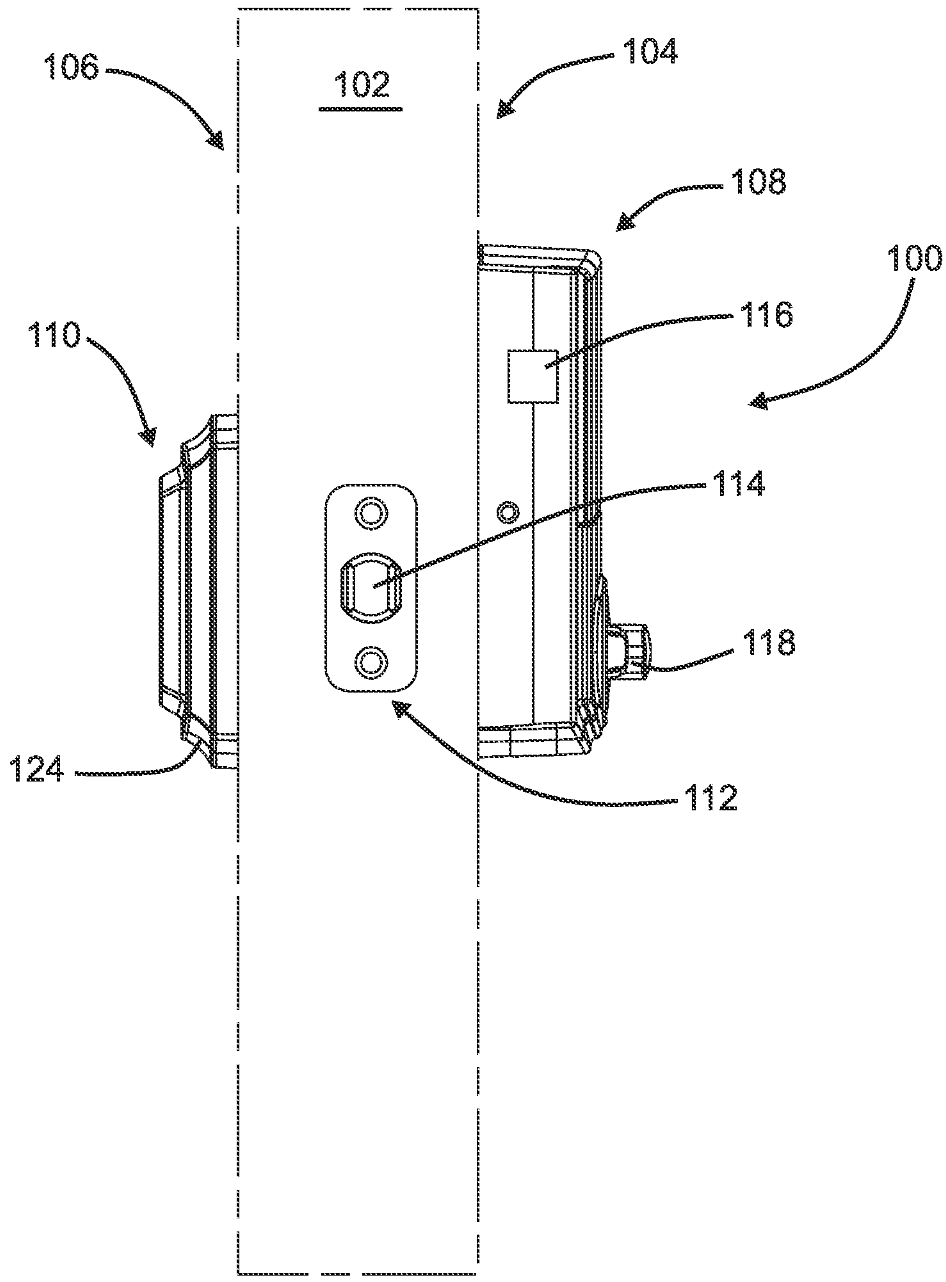
FIG. 2 is a perspective view of the electronic lock of FIG. 1 installed on a door.
Figure 3:
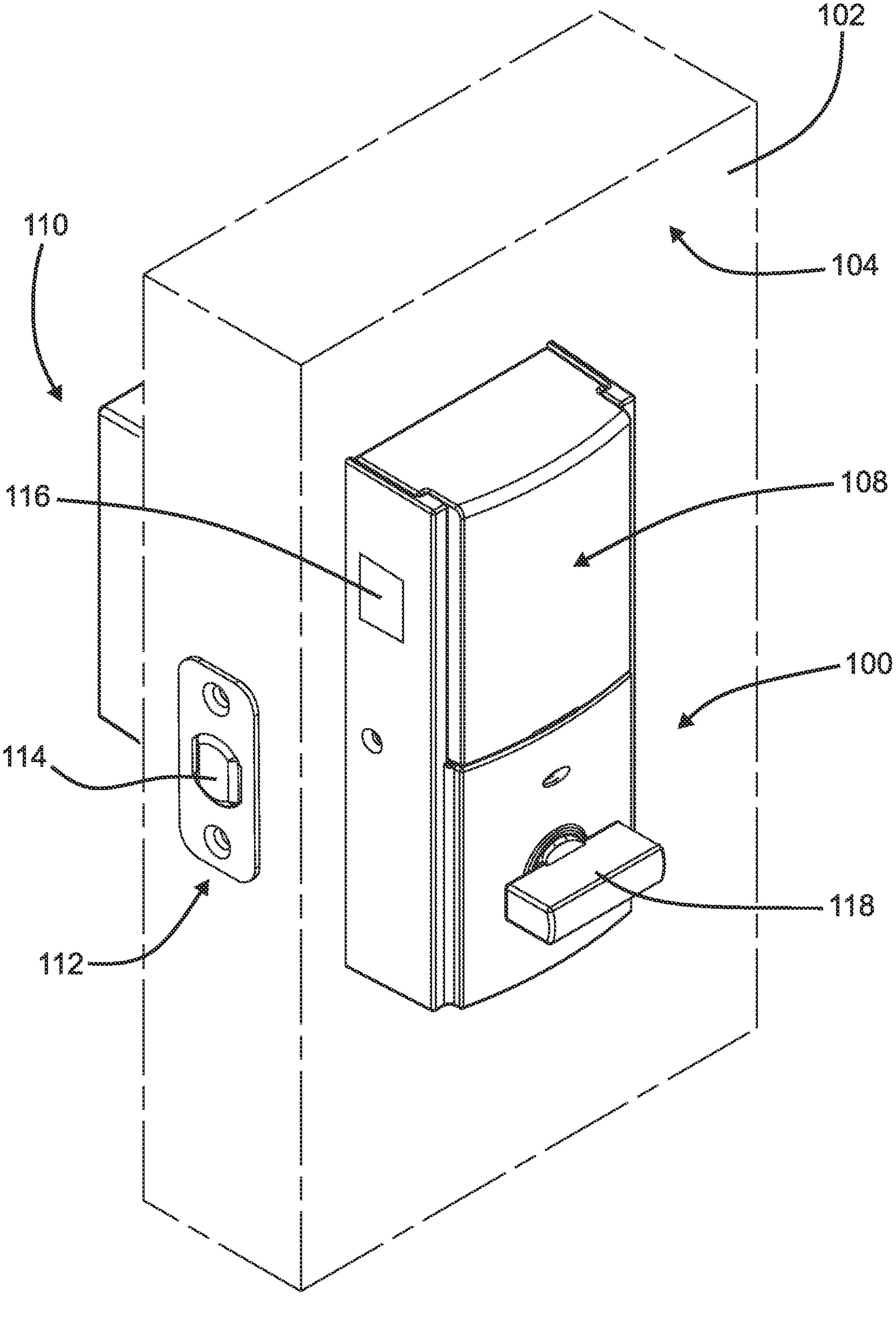
FIG. 3 is an interior perspective view of the electronic lock of FIG. 1 installed on a door.
Figure 4:
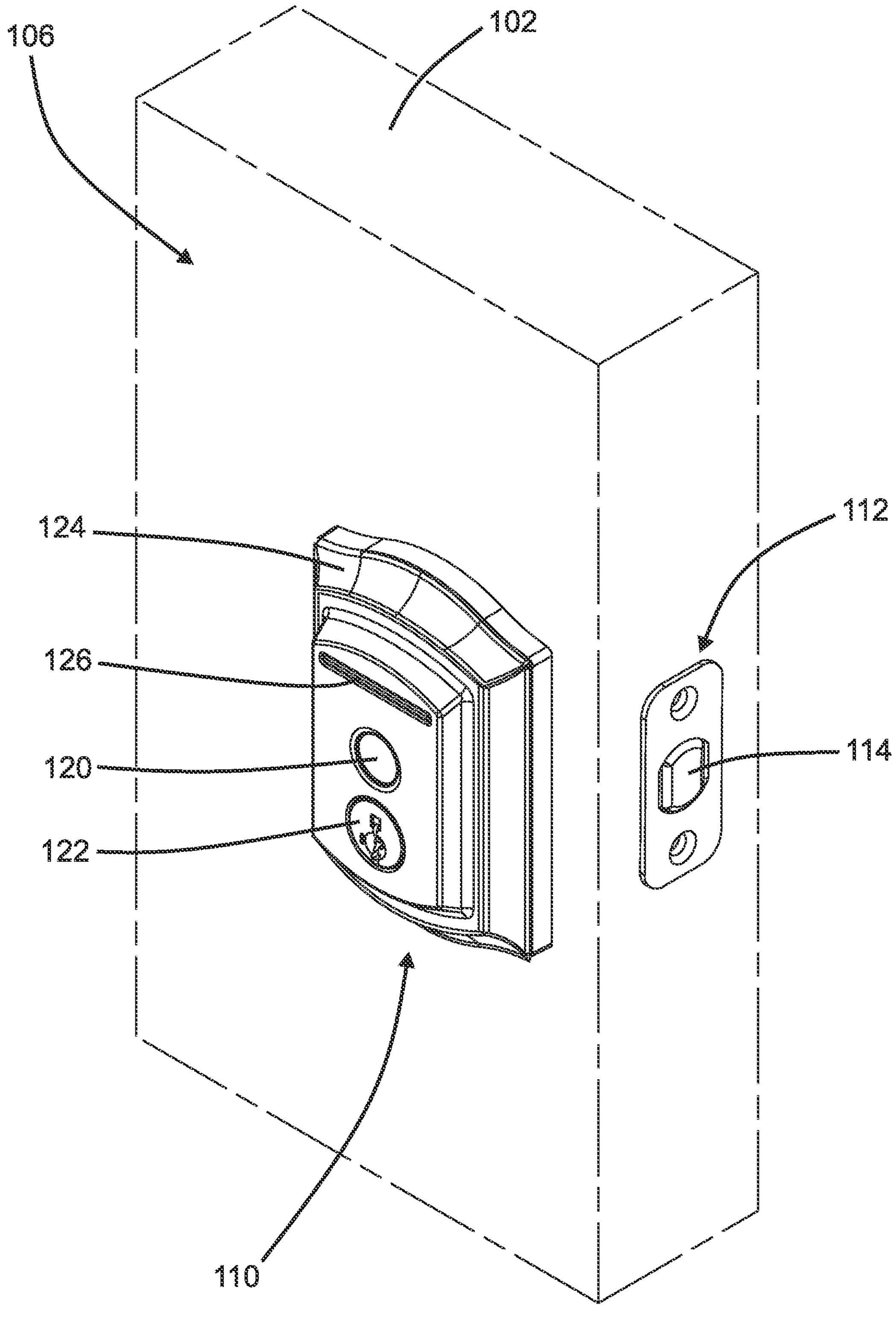
FIG. 4 is an exterior perspective view of the electronic lock of FIG. 1 installed on a door.

The latch assembly 112 is shown to include the bolt 114 that is movable between an extended position (locked) and a retracted position (unlocked, shown in FIGS. 1-3). Specifically, the bolt 114 is configured to slide longitudinally and, when the bolt 114 is retracted, the door 102 is in an unlocked state. When the bolt 114 is extended, the bolt 114 protrudes from the door 102 into a door jamb (not shown) to place the door in a locked state.

The processing unit 116 is operable to execute a plurality of software instructions (i.e., firmware) that, when executed by the processing unit 116, cause the electronic lock 100 to implement the methods and otherwise operate and have functionality as described herein. The processing unit 116 may comprise a device commonly referred to as a microprocessor, central processing unit (CPU), digital signal processor (DSP), or other similar device and may be embodied as a standalone unit or as a device shared with components of the electronic lock 100. The processing unit 116 may include memory for storing the software instructions, or the electronic lock 100 may further comprise a separate memory device for storing the software instructions that is electrically connected to the processing unit 116 for the bi-directional communication of the instructions, data, and signals therebetween.

In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi), the IEEE 802.15.4 standard (Zigbee and Z-wave), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment.

The exterior assembly 110 includes a first authentication source 120, a second authentication source 122, and escutcheon 124. In some examples, the exterior assembly 110 includes only one authentication source. In some examples, the exterior assembly 110 includes more than the first and second authentication sources 120, 122. In some examples, the exterior assembly 110 includes a light source 126.

The first authentication source 120 is shown to be exposed at the exterior assembly 110, through the escutcheon 124. The first authentication source 120 is shown to be a biometric sensor, such as a fingerprint sensor. In some examples, the fingerprint sensor is configured to capture an image of a least a portion of a fingerprint placed thereon. The biometric sensor can utilize optical, capacitance, thermal, pressure, low radio frequency, and/or ultrasonic technology to capture the image of the fingerprint. In addition, the biometric sensor can be configured to utilize a static sensor or a moving sensor. In some examples, the biometric sensor is configured to allow a finger to be swiped over the biometric sensor. In some examples, software can be utilized that takes a complete snapshot of the finger.

The second authentication source 122 is shown to be exposed at the exterior assembly 110. The second authentication source 122 can be at least one of at least one of a mechanical lock, a keypad, a touch surface, a NFC reader, and/or the like. In the depicted example, the second authentication source 122 is a keyway for a mechanical lock. If the second authentication source 122 is a keypad, the keypad can be one of a numeric keypad, an alpha keypad, and/or an alphanumeric keypad. The keypad can have a plurality of characters displayed thereon. For example, the keypad can include a plurality of buttons that can be mechanically actuated by the user (e.g., physically pressed). In some examples, the keypad includes a touch interface, such as a touch screen or a touch keypad, for receiving a user input. The touch interface is configured to detect a user's "press of a button" by contact without the need for pressure or mechanical actuation. An example of the touch interface is described in U.S. Pat. No. 9,424,700 for an "ELECTRONIC LOCK HAVING USAGE AND WEAR LEVELING OF A TOUCH SURFACE THROUGH RANDOMIZED CODE ENTRY," which is hereby incorporated by reference in its entirety.

In further examples, the electronic lock 100 includes other types of touch activation capability. In some embodiments, for example, the outside cover of the lock is touch sensitive and allows a user to touch the lock to activate various functions of the lockset.

In some examples, the electronic lock 100 can require the first and second authentication sources 120, 122 to be used in concert with one another. For example, a code must be input into the second authentication source 122 after a valid fingerprint is sensed at the first authentication source 120. In other examples, the electronic lock 100 can allow for use of the first and second authentication sources individually and separate from one another.

The escutcheon 124 can be an aesthetic trim for the electronic lock 100. In some examples, the electronic lock is configured to accept a variety of different escutcheons. In some examples, the escutcheon 124 is tamper proof.

The light source 126 can be disposed at the exterior assembly 110 and configured to shine through the escutcheon 124 at the front portion electronic lock 100. The light source 126 is configured to display a plurality of responses or signals to the user. The light source 126 may also selectively illuminate to communicate various messages to the user. For example, the light source 126 may illuminate in white to indicate an operational status, red for a malfunction, flash to indicate an unreadable fingerprint, or any other color/flashing combination. The light source 126 may also be a battery low signal or an error signal. Any other symbols may be used as well to convey messages to the user, indicate battery levels, indicate malfunctions, and/or indicate operational status. An example of an electronic lock using a light source for communication is described in U.S. Pat. No. 9,024,759 for a "WIRELESS LOCKSET WITH INTEGRATED ANTENNA, TOUCH ACTIVATION, AND LIGHT COMMUNICATION METHOD," which is hereby incorporated by reference in its entirety.

In some examples, a camera can be used to monitor the environment adjacent the exterior assembly 110. In some examples, the camera is capable of capturing still photos and/or video media and storing such media locally at the electronic lock 100 and/or in a remote location (i.e., the cloud). An example of an electronic lock with a camera is described in U.S. Pat. No. 10,033,972 for an "ELECTRONIC LOCK WITH REMOTE MONITORING," which is hereby incorporated by reference in its entirety.

In some examples, the exterior assembly 110 is electrically connectable to the interior assembly 108 via a wiring harness 130. Specifically, the wiring harness 130 passes through the door 102. The electrical connection between the exterior assembly 110 and the interior assembly 108 allows the processing unit 116 to communicate with, and power, other features included in the exterior assembly 110. For example, when the user inputs a valid code via a keypad that is recognized by the processing unit 116, an electrical motor is energized to retract the bolt 114 of latch assembly 112, thus permitting door 102 to be opened from a closed position.

Figure 5:
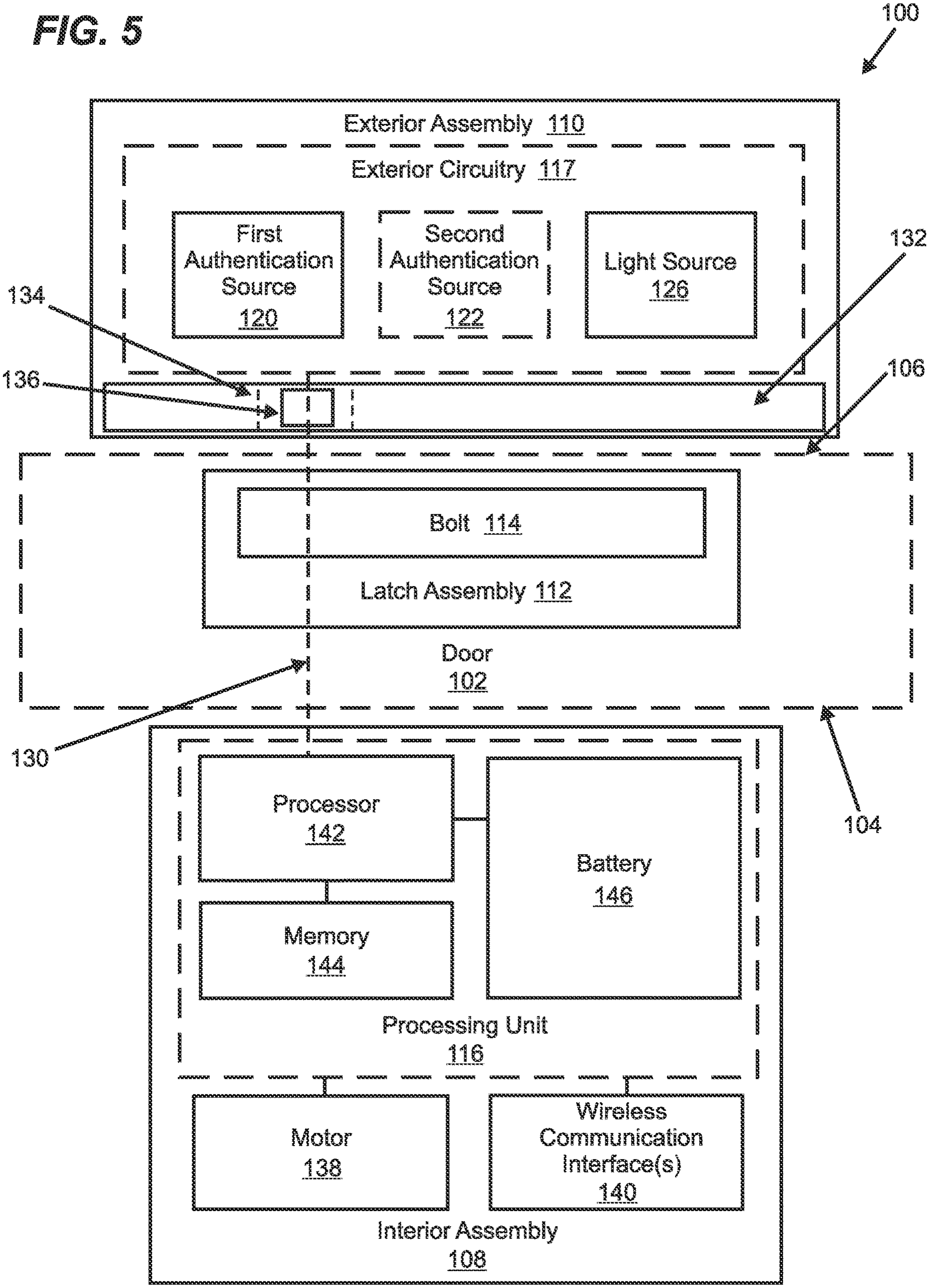
FIG. 5 is a schematic of the electronic lock of FIG. 1.

FIG. 5 is a schematic representation of the electronic lock 100 mounted to the door 102. The interior assembly 108, the exterior assembly 110, and the latch assembly 112 are shown.

The exterior assembly 110 is shown to include electronic circuitry 117 communicatively and electrically connected to the processing unit 116. The exterior assembly 110 includes the first and second authentication sources 120,122, the light source 126, and a mounting plate 132. Specifically, the electronic circuitry 117 includes the first authentication source 120 and the light source 126. In some examples, the electronic circuitry 117 includes the second authentication source 122.

The mounting plate 132 is configured to mate with the exterior side 106 of the door 102. The mounting plate 132 also includes a port 134 to allow the wiring harness 130 to pass there through to the electronic circuitry 117. The port 134 includes a seal 136 positioned therein to aid in sealing between the wiring harness 130 and the plate 132, and therefore the exterior assembly 110.

As described above, the interior assembly 108 includes the processing unit 116, a motor 138, and a wireless communication interface 140. As shown, the processing unit 116 includes a processor 142 communicatively connected to memory 144 and a battery 146. The processing unit 116 is located within the interior assembly 108 and is capable of operating the electronic lock 100, e.g., by actuating the motor 138 to actuate the bolt 114 of the latch assembly 112. In some examples, the processing unit 116 operates the motor 138 if a valid fingerprint is received at the first authentication source 120.

The motor 138 is capable of actuating the bolt 114. In use, the motor 138 receives an actuation command from the processing unit 116, which causes the motor 138 to actuate the bolt 114 from the locked position to the unlocked position or from the unlocked position to the locked position. In some examples, the motor 138 actuates the bolt 114 to an opposing state. In some examples, the motor 138 receives a specified lock or unlock command, where the motor 138 only actuates the bolt 114 if the bolt 114 is in the correct position. For example, if the door 102 is locked and the motor 138 receives a lock command, then no action is taken. If the door 102 is locked and the motor 138 receives an unlock command, then the motor 138 actuates the bolt 114 to unlock the door 102.

The wireless communication interface 140 is capable of providing at least one wireless communication protocol. In some examples, the processing unit 116 can communicate with a remote device via the wireless communication interface 140. In some examples, the processing unit 116 can communicate with a distributed system via the wireless communication interface 140. In other examples still, the processing unit 116 can communicate with a remote server via the wireless communication interface 140. The wireless communication interface 140 can include one or more wireless communication interfaces, e.g., Bluetooth, Wi-Fi (IEEE 802.11x protocols), or any other wireless communication interface capable of bidirectional wireless communication. In example embodiments, the wireless communication interface 140 can include a Bluetooth Low Energy (BLE) interface. In another example embodiment, the wireless communication interface 140 communicates with a router via Wi-Fi. The router may be a standard router connected to a network, located within the building. Alternatively, the wireless communication interface 140 may communicate with a router through a Zigbee communication protocol. Still further, the wireless communication interface 140 may communicate with a router through a Bluetooth communication protocol.

The memory 144 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments In some embodiments, the electronic lock 100 is made of mixed metals and plastic, with engineered cavities to contain electronics and antennas. For example, in some embodiments, the electronic lock utilizes an antenna near the exterior assembly 110, designed inside the metal body of the lockset itself. The metal body can be engineered to meet strict physical security requirements and also allow an embedded front-facing antenna to propagate RF energy efficiently.

Figure 6:
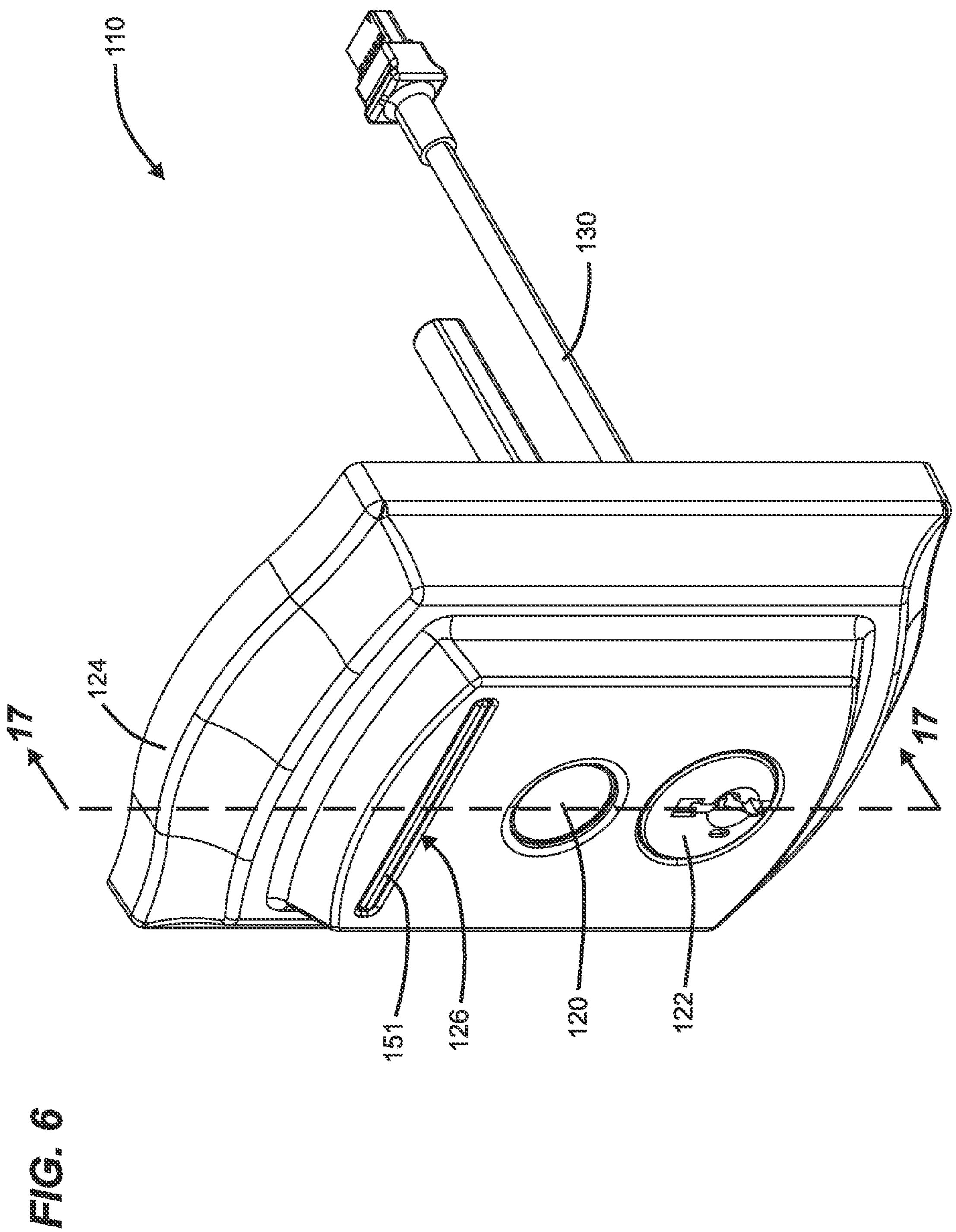
FIG. 6 is a front perspective view of an exterior assembly of the electronic lock of FIG. 1.
Figure 7:
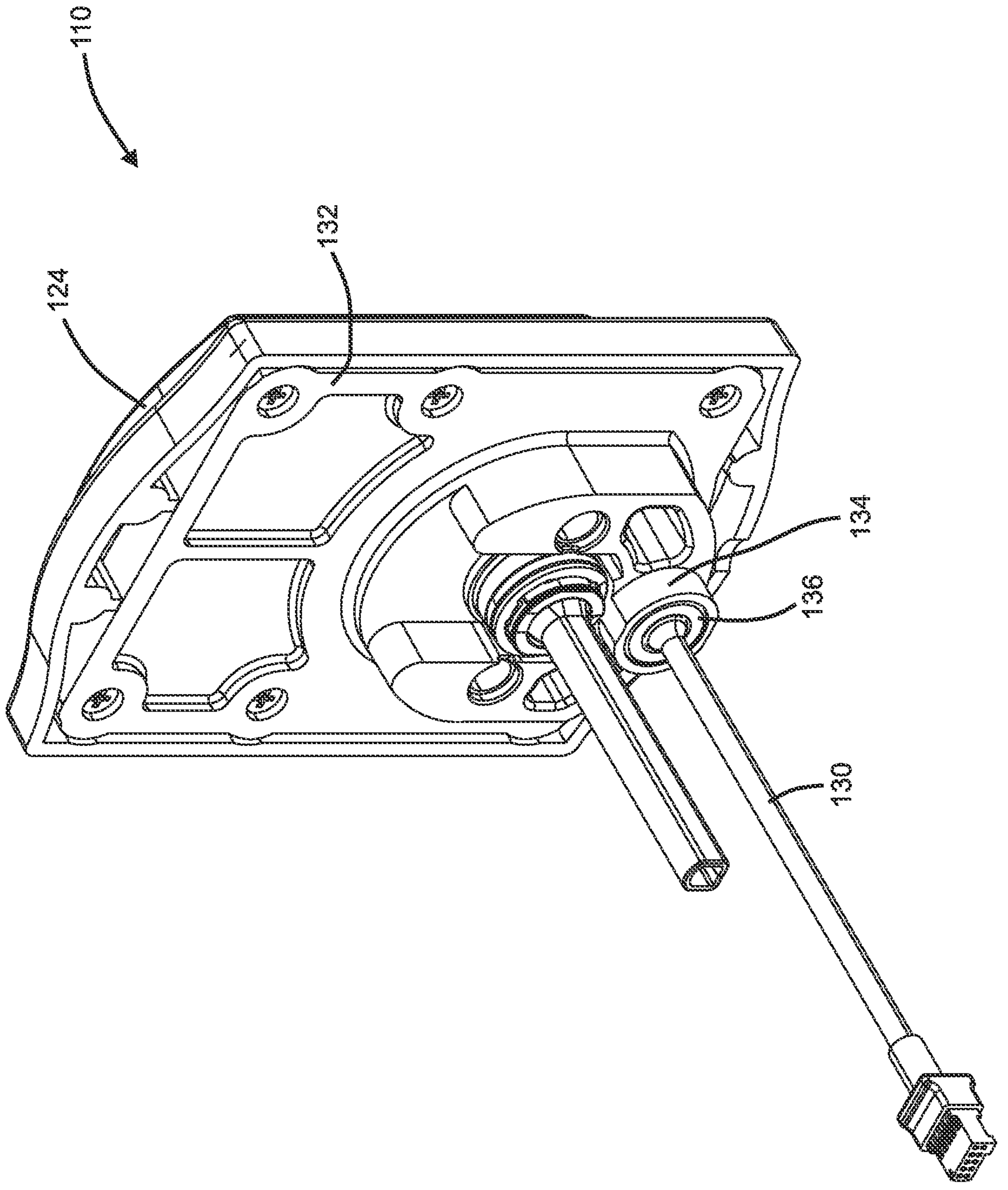
FIG. 7 is a rear perspective view of the exterior assembly of FIG. 6.

FIGS. 6-7 show the perspective views of the exterior assembly 110.

Figure 8:
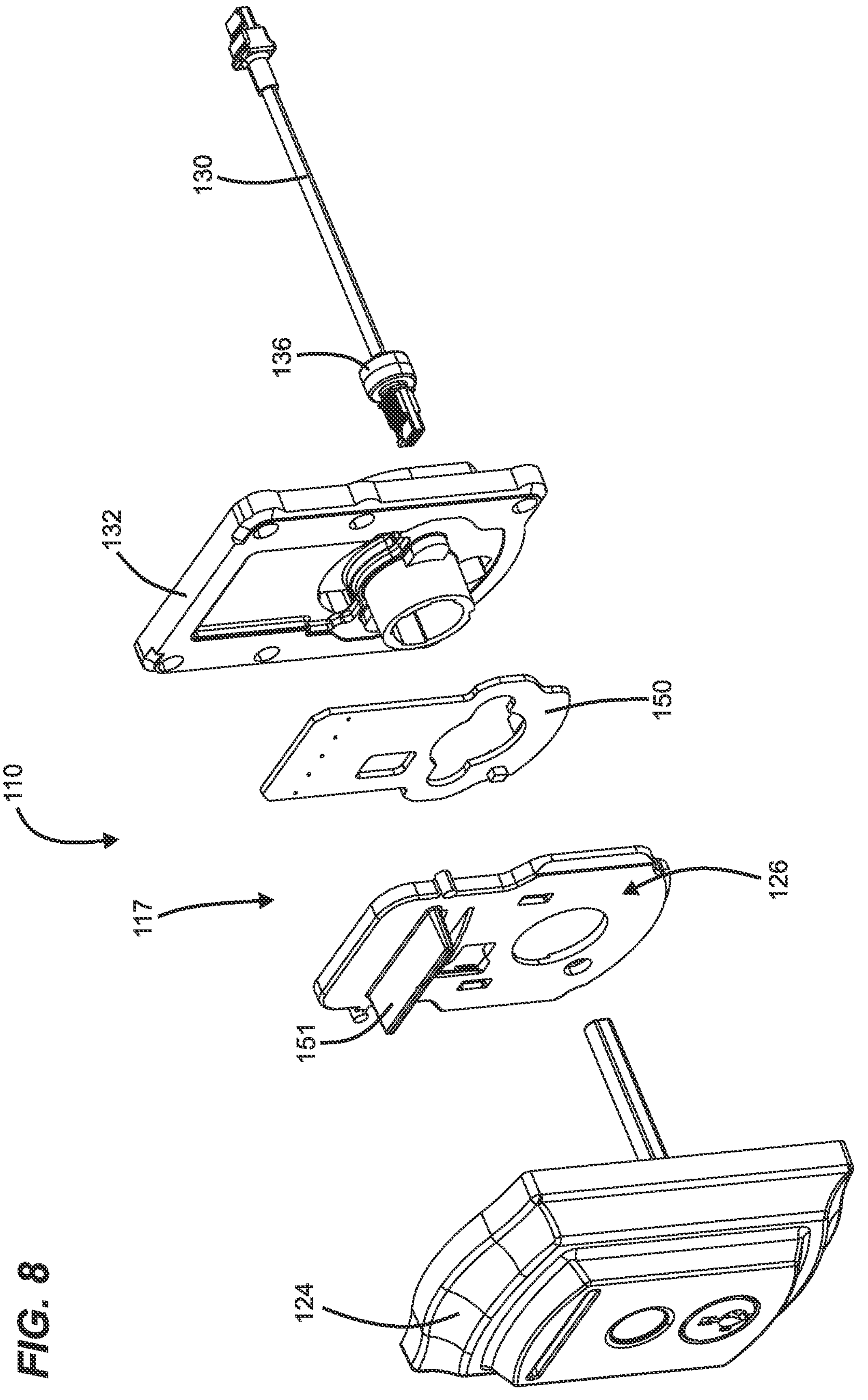
FIG. 8 is a front exploded view of the exterior assembly of FIG. 6.
Figure 9:
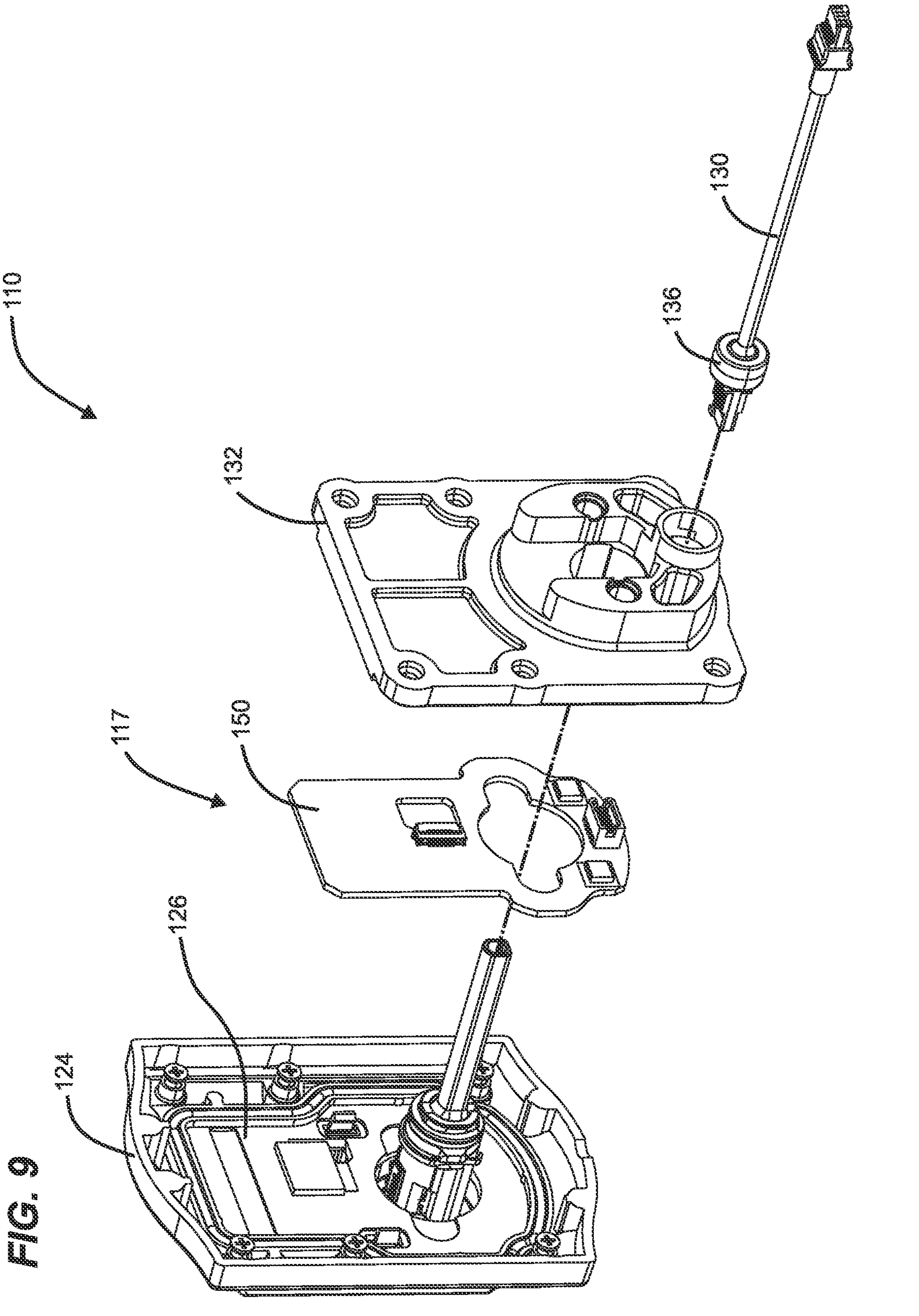
FIG. 9 is a rear exploded view of the exterior assembly of FIG. 6.

FIGS. 8 and 9 show exploded views of the exterior assembly 110.

As shown, the exterior assembly 110 includes the escutcheon 124, the electronic circuitry 117, and the mounting plate 132. The exterior assembly 110 can include a variety of other components; however, exterior assembly 110 is depicted simplified. The wiring harness 130 is shown to be selectively connectable to the electronic circuitry 117 at a wiring harness electrical receptacle 148 electrically coupled with the electronic circuitry 117.

As shown in FIG. 6, the exterior assembly 110 includes a first seal 121 positioned around the first authentication source 120 and between the first authentication source 120 and the escutcheon 124. The first seal 121 seals the first authentication source 120. In some examples, the first seal 120 seals the first authentication source 120 so that dust, water, or other like contaminants cannot gain access to the first authentication source 120. In some examples, the first seal 121 is comprised of a rubber material. In some examples, the first seal 121 is comprised of a semi-rigid transparent material. In some examples, the first seal 121 is configured to emit light. In some examples, the first seal 121 is configured to emit light from the light source 126.

The electronic circuitry 117 includes a printed circuit board assembly 150 (hereinafter "PCBA") and the light source 126. The PCBA 150 includes the first authentication source 120 electrically coupled thereto.

Figure 10:
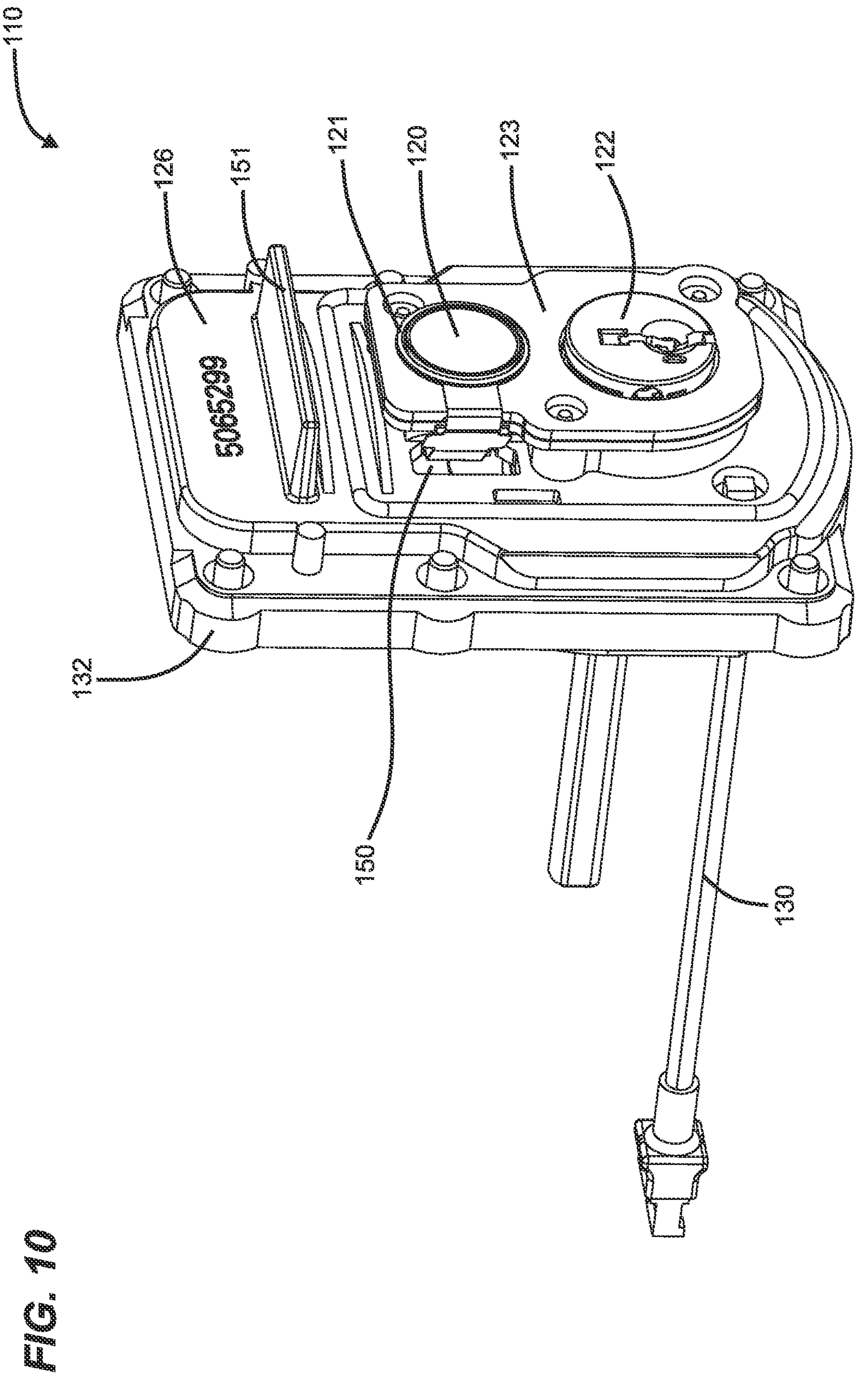
FIG. 10 is a front perspective view of the exterior assembly of the electronic lock of FIG. 1. with an escutcheon removed.

As shown in FIG. 10, where the escutcheon 124 is removed, the first authentication source 120 passes through the light source 126 before coupling with the PCBA 150. In some examples, the light source 126 is also electrically coupled to the PCBA 150. In some examples, the light source 126 has a light bar 151, or other shape, to display messages that passes through the escutcheon 124. In the depicted example, the PCBA 150 is sized and shaped to be positioned around portions of the second authentication source 122. The electronic circuitry 117 is configured to electronically connect the first authentication source 120 and the wiring harness electrical receptacle 148. This allows information received at the first authentication source 120 to be communicated to the processor 116 at the interior assembly 108 via the wiring harness 130.

A second seal 123 is shown positioned next to, and behind, the first authentication source 120. In some examples, the first authentication source 120 is positioned between to the escutcheon 124 and the second seal 123. In the depicted example, the second seal 123 is also positioned surrounding the second authentication source 122. In some examples, the second seal is compressible. In some examples, a force received at the first authentication source 120 compresses the second seal 123. In some examples, the second seal is a foam.

Wiring Harness Sealing

Figure 11:
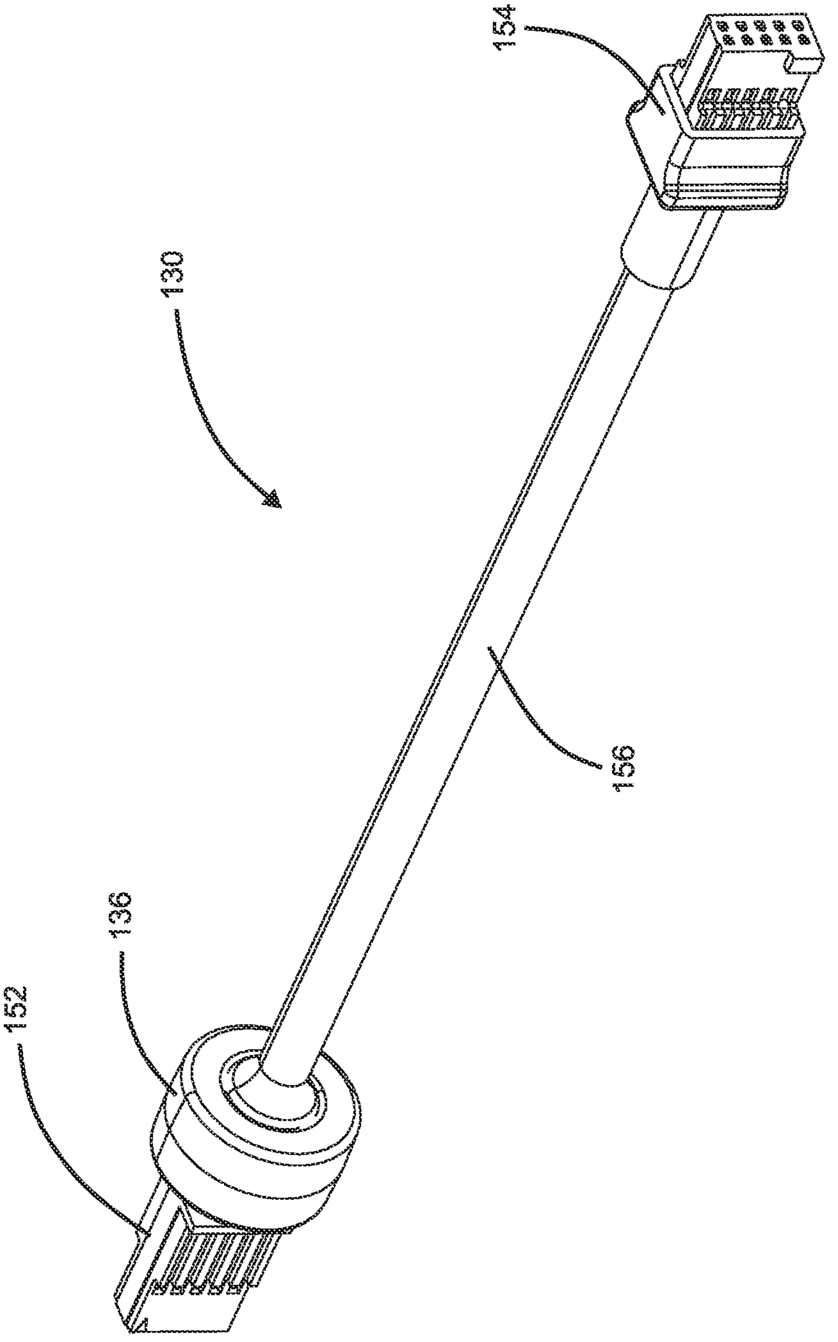
FIG. 11 is a perspective view of a wiring harness, according to one example of the present disclosure.

The wiring harness 130, including the seal 136, is shown in FIG. 11. The wiring harness 130 includes an exterior connector 152 and an interior connector 154 for connection to the exterior and interior assembles 110, 108 respectively. A wire 156 connects the interior and exterior connectors 152, 154.

The seal 136 can be a variety of different materials to seal between the wiring harness 130 and the port 134. In some examples, the seal 136 forms a seal around the wiring harness 130 and also inside of the port 134. In some examples, the seal 136 is not compressible. In some examples, the seal 136 is comprised of a resilient, compressible material. By being compressible, the volume of seal 136 changes as the amount of pressure being exerted on the seal 136 changes. In some examples, the volume of the seal can shrink when under pressure. In some examples, the seal 136 is comprised of a rubber, thermoplastic elastomer, or vulcanized rubber. The seal 136 aids in sealing the port 134 so that dust, water, or other like contaminants cannot gain access to the exterior assembly 110 via the port 134.

The exterior and interior connectors 152, 154 are shown to have a generally square cross-section. Specifically, the cross-sections are rectangular shaped. However, it is considered within the scope of the present disclosure that the connecters 152, 154 can be shaped in a variety of different ways. In some examples, the exterior and interior connectors 152, 154 are manufactured from a plastic material.

Figure 12:
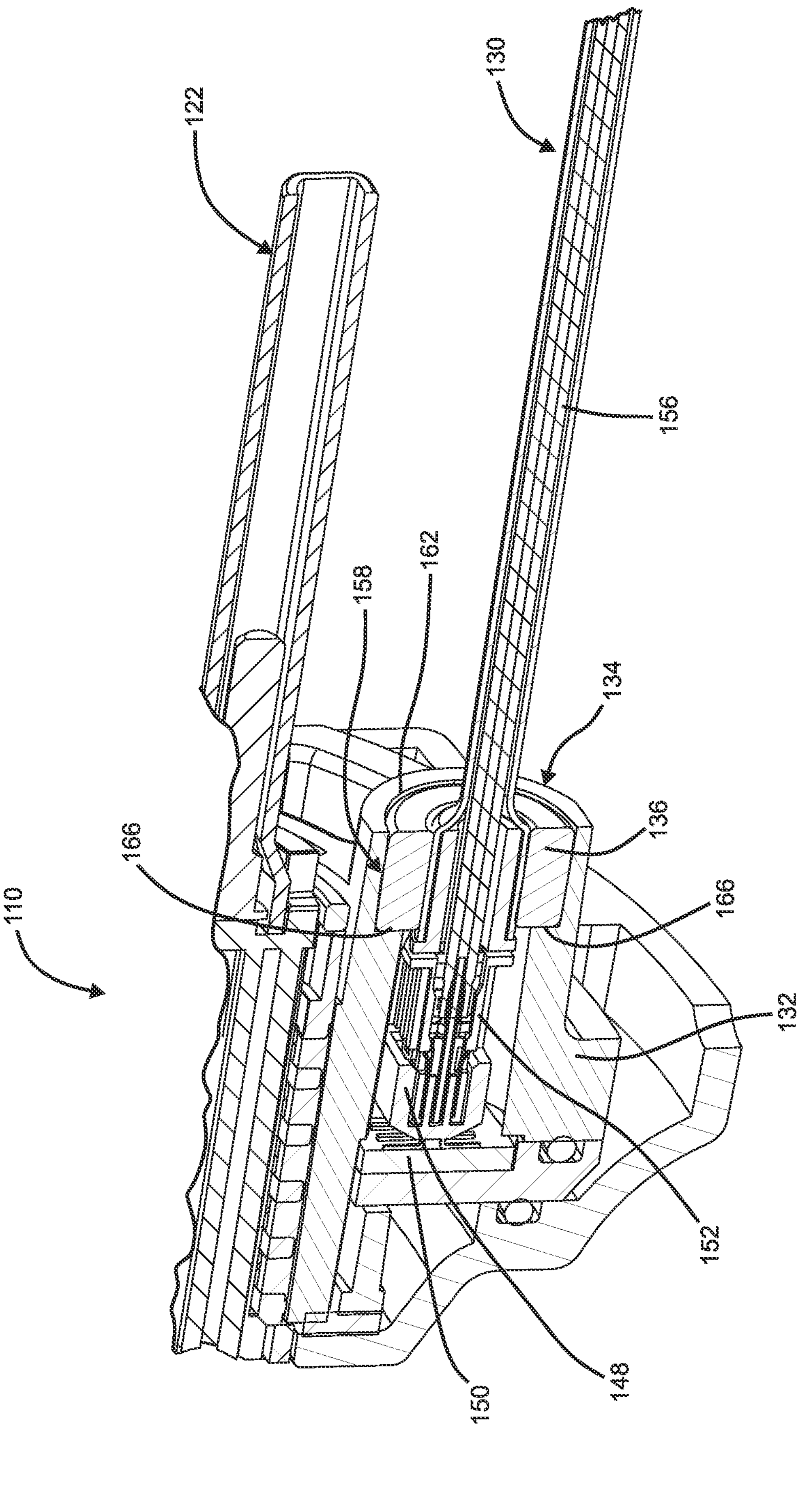
FIG. 12 is a schematic section view of a portion of the exterior assembly of FIG. 6.

FIG. 12 shows the wiring harness 130 connected to the wiring harness receptacle 148. Specifically, the exterior connector 152 of the wiring harness 130 is connected to the wiring harness electrical receptacle 148 and the wiring harness 130 is positioned with the port 134 of the mounting plate 132. It is considered within the scope of the present disclosure that the connection between the exterior connector 152 and the wiring harness electrical receptacle 148 can be configured in a variety of different ways so long as an electrical connection between the wiring harness 130 and the electronic circuitry 117 exists. For example, the male/female relationship between the exterior connector 152 and the wiring harness electrical receptacle 148 can be reversed from what is depicted. In some examples, the wiring harness electrical receptacle 148 is aligned with the port 134 to allow for the exterior connector 152 of the wiring harness 130 to pass through the port 134.

The port 134 is configured to retain the wiring harness 130 therein. This is advantageous for a few reasons, as retention of the wiring harness 130 is beneficial for the installation and operation of the electronic lock 100. Specifically, the port 134 is configured to hold the wiring harness 130 therein to reduce relative movement of the wiring harness 130 and the port 134. In some examples, the exterior connector 152 and the port 134 aid to axially retain the exterior connector 152 within the port 134. This retention prevents the exterior connector 152 from being accidentally unplugged from the wiring harness electrical receptacle 148 of the electronic circuitry. In some examples, the port 134 accomplishes this retention of the wiring harness 130 without the use of other devices to aid in securing the wiring harness 130.

The port 134 includes a first portion 158 and a second portion 160. In some examples, the first and second portions 158, 160 are immediately adjacent one another.

The first portion 158 is sized and shaped to position the seal 136 of the wiring harness 130 between walls 162 of the first portion 158 and the wiring harness 130. In some examples, the walls 162 define a generally circular opening; however, it is considered within the scope of the present disclosure that the walls 162 can form a variety of shapes to receive the seal. In some examples, the walls 162 do not surround the seal 136.

The second portion 160 includes port barriers 166 sized and shaped to allow for wiring harness 130 to pass through the second portion 160 when the wiring harness 130 is in a first orientation. The port barriers 166 also limit axial movement of the wiring harness 130 through the second portion 160 when the wiring harness is in a second orientation. In some examples, the port barriers 166 seat the seal 136 and prevent the seal 136 from being positioned in the second portion 160.

Figure 13:
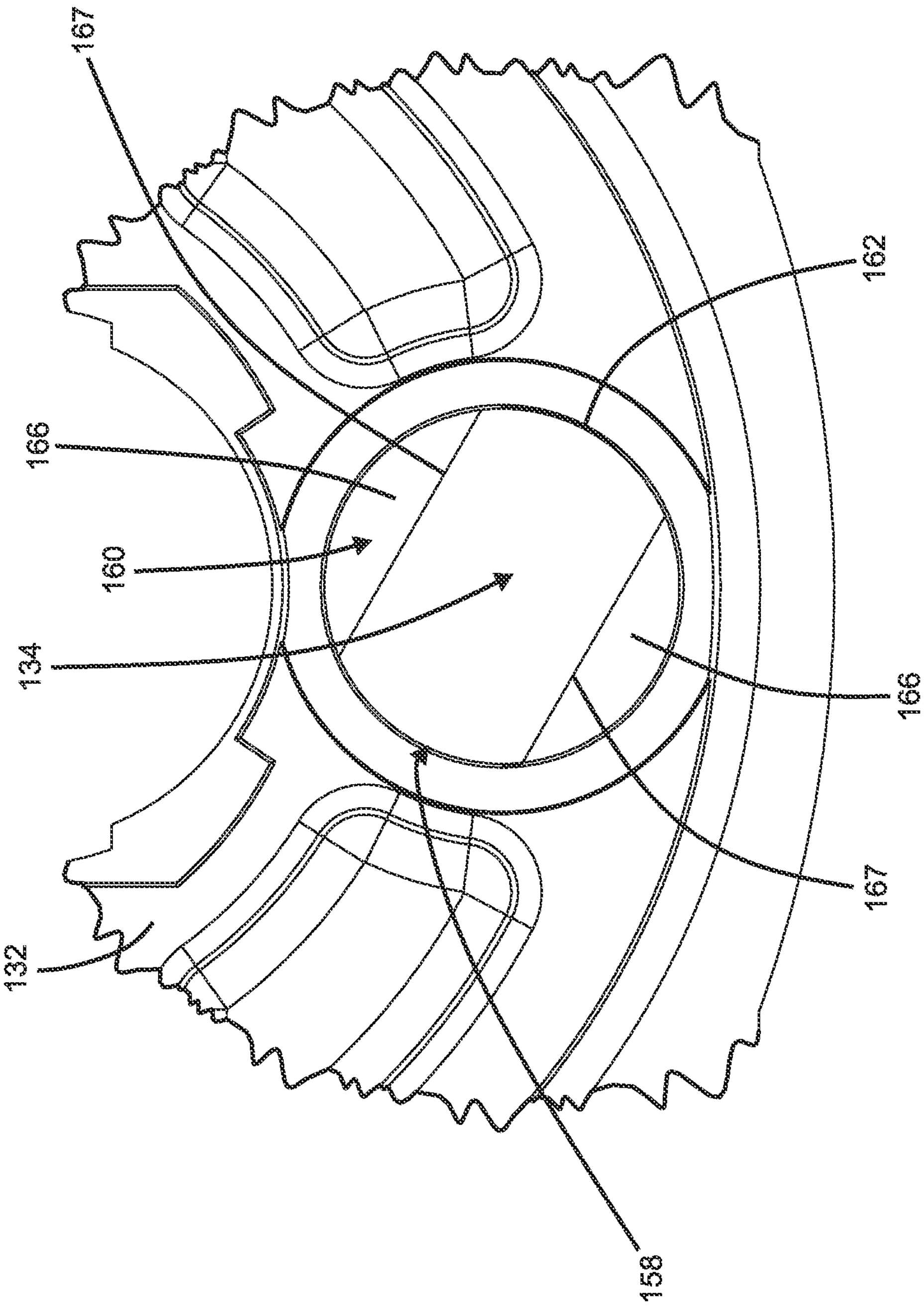
FIG. 13 is a front view of a port of a mounting plate of the exterior assembly of the electronic lock of FIG. 1.

FIG. 13 shows the port 134 from a front view. The first portion 158, with walls 162, and the second portion 160, with port barriers 166, are shown. As shown, the port barriers 166 define an opening between opening walls 167 that is generally rectangular shaped and configured to receive the exterior connector 152 of the wiring harness 130 in the first orientation. It is considered within the scope of the present disclosure that the port barriers 166 can define a variety of different shapes to allow the exterior connector 152 to pass through in the first orientation and be retained in a second orientation.

Figure 14:
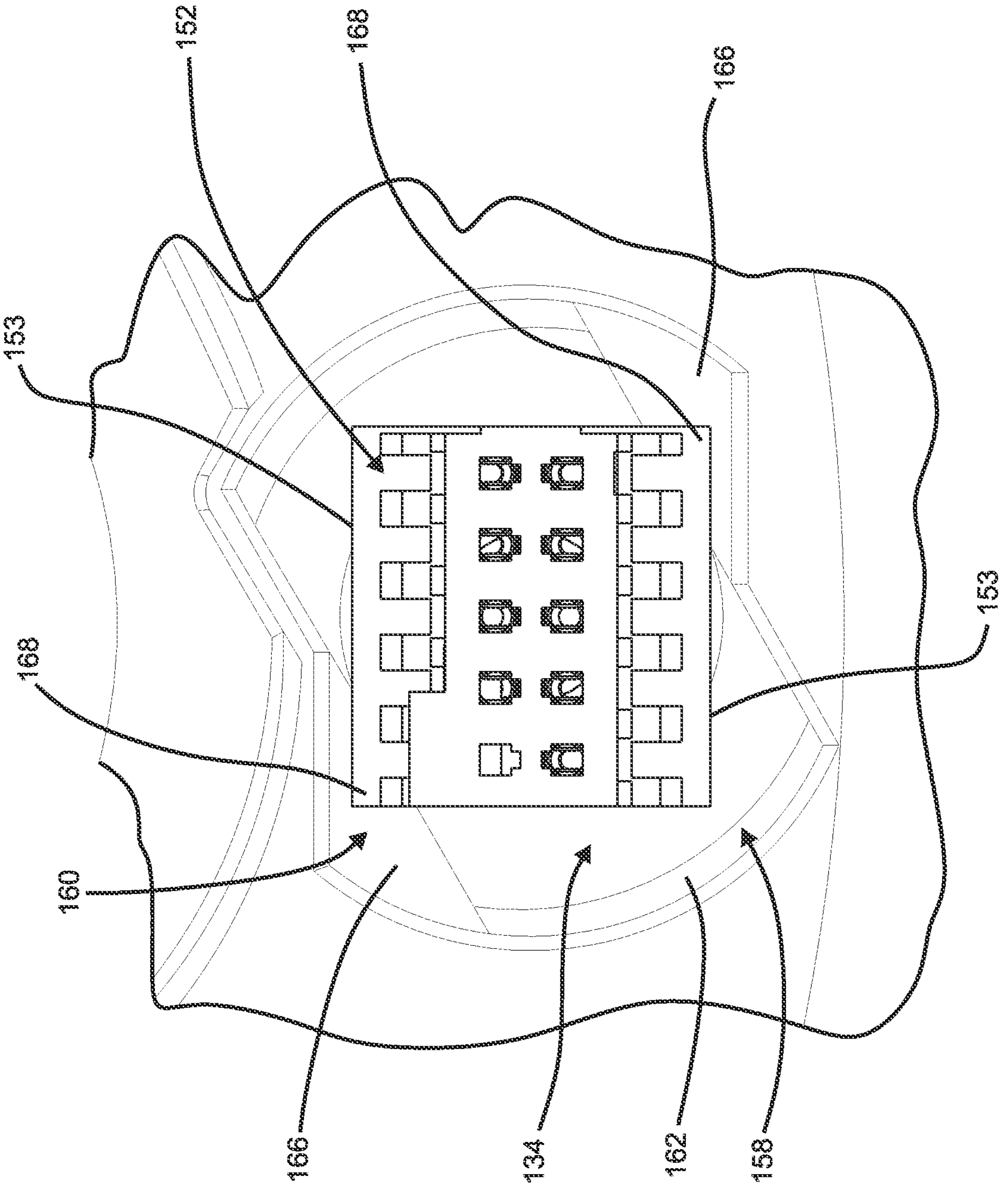
FIG. 14 is a rear view of the port of FIG. 13.

FIG. 14 shows the port 134 from a rear view. The exterior connector 152 is also shown positioned within the port 134. As shown the exterior connector 152 is in the second orientation. When in the second orientation, corners 168 of the exterior connecter 152 contact the port barriers 166 and the port barriers 166 prevent the exterior connecter 152, and thereby the wiring harness 130, from moving axially within the port 134. In the second orientation, sides 153 of the exterior connector 152 are generally radially misaligned with the opening walls 167 of the port barriers 166.

Figure 16:
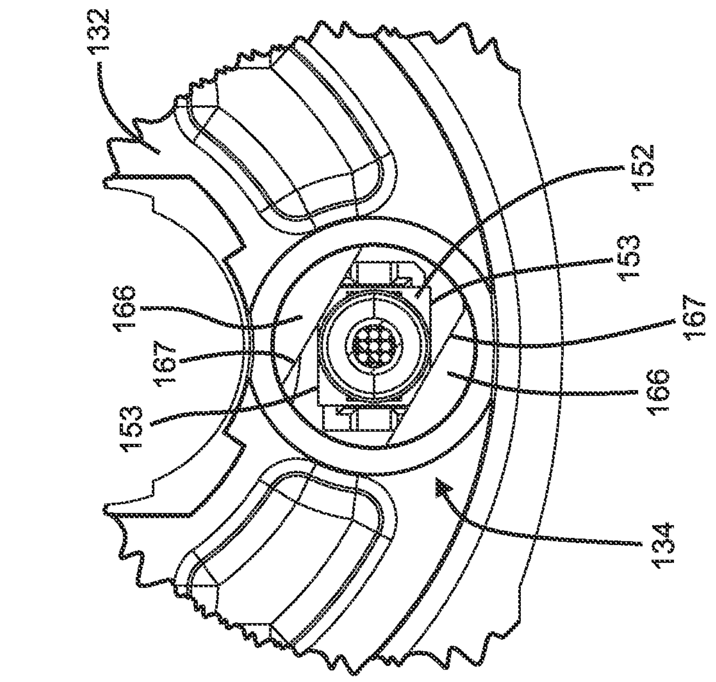
FIG. 16 is a front view of the port of FIG. 13 with the wiring harness positioned in a second orientation therein.
Figure 15:
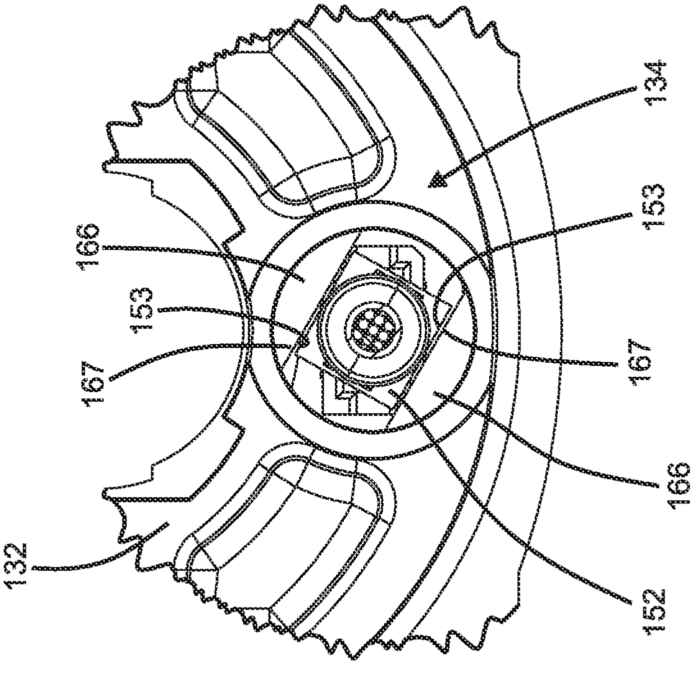
FIG. 15 is a front view of the port of FIG. 13 with a wiring harness positioned in a first orientation therein.

FIGS. 15 and 16 show the front of the port 134. As shown in FIG. 15, the exterior connector 152 is positioned in the first orientation so as to pass the port barriers 166 to the wiring harness electrical receptacle 148. As shown, in the first orientation, the sides 153 of exterior connector 152 are generally radially aligned in the port 134 with the opening walls 167 of the port barriers 166 to allow for relative axial movement between the port 134 and the wiring harness 130. As shown in FIG. 16, in the second orientation, the sides 153 of exterior connector 152 are generally radially misaligned in the port 134 with the opening walls 167 of the port barriers 166 to prevent relative axial movement between the port 134 and the wiring harness 130.

A method of attaching the wiring harness 130 to the exterior assembly 110 of the electronic lock 100 includes providing the exterior assembly 110 and an interior assembly 108. The method includes providing the wiring harness 130 connectable to the exterior and interior assemblies 110, 108 to allow communication therebetween, the wiring harness having the exterior connector 152. The method includes manipulating the exterior connector 152 to pass into and through the wiring harness receiving port 134 of the exterior assembly 110, then manipulating the exterior connector 152 within the wiring harness receiving port 134 to axially secure the exterior connector within the wiring harness receiving port of the exterior assembly. The method can also include positioning the wiring harness seal 136 around the wiring harness 130 and within the wiring harness port 134 defined by the exterior assembly 110. The method can also include rotating the exterior connector 152 after the wiring harness 130 is positioned in the port 134.

Figure 17:
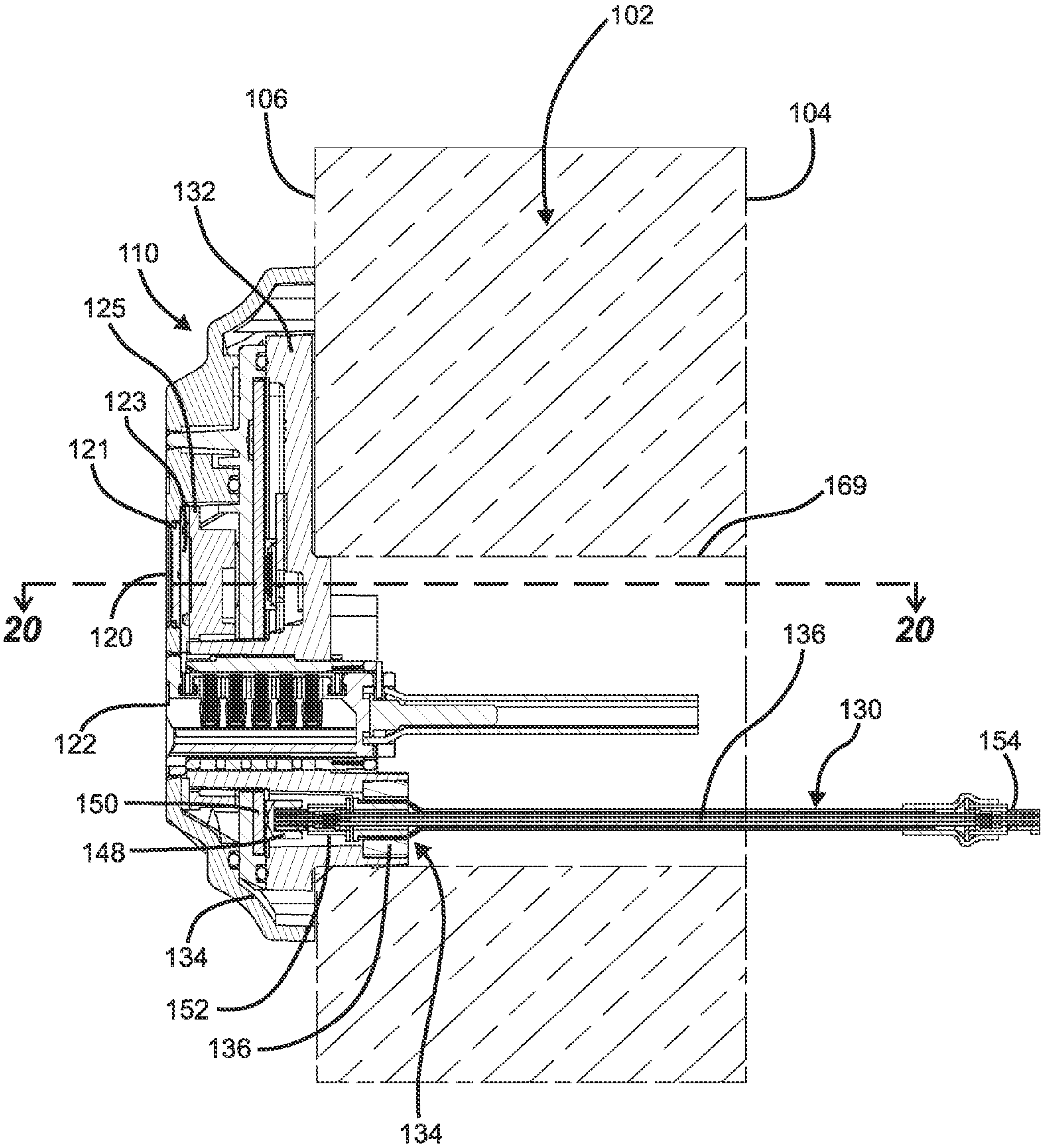
FIG. 17 is a schematic section view of the electronic lock of FIG. 1 installed on a door.

FIG. 17 shows the exterior assembly 110 during installation on the exterior side 106 of the door 102. Specifically, FIG. 17 shows a sectional view of the electronic lock 100 along line 17-17 in FIG. 6. Specifically, the wiring harness 130 is routed through a bore 169 of the door 102 to the interior side 104 of the door 102. In some examples, because the wiring harness 130 is secured to the plate 132 by the port 134, the wiring harness 130 can be manipulated from the interior side 104 of the door 102 without the possibility of the exterior assembly 110 becoming unattached from the wiring harness 130 and falling to the ground.

Sensor Sealing

Figure 18:
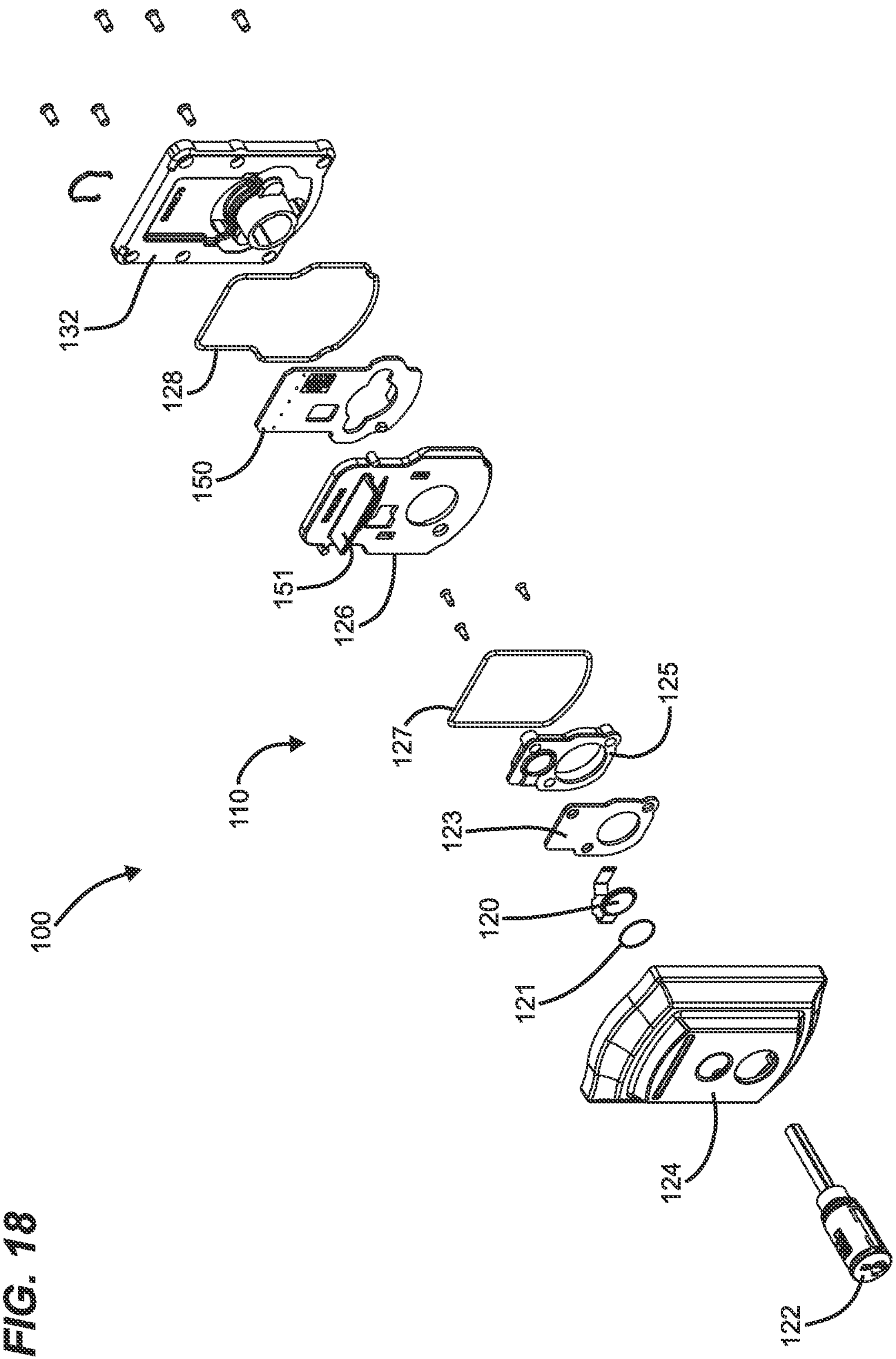
FIG. 18 is a front perspective exploded view of the exterior assembly of the electronic lock of FIG. 1.
Figure 19:
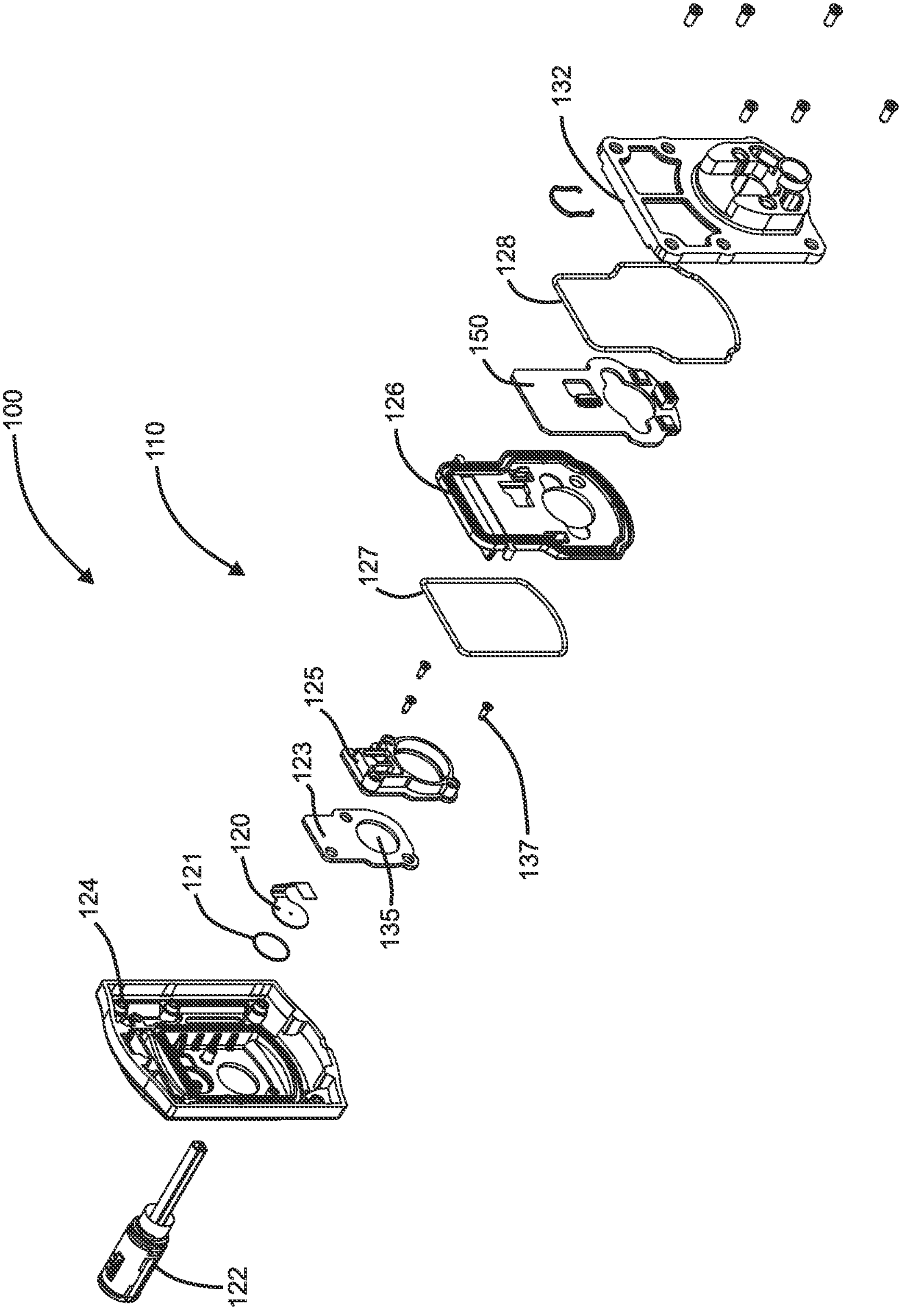
FIG. 19 is a rear perspective exploded view of the electronic lock of FIG. 1.

FIG. 18 is a front perspective exploded view of the electronic lock 100, specifically the exterior assembly 110. FIG. 19 shows a rear perspective exploded view of the exterior assembly 110 of the electronic lock 100. The exterior assembly 110 is shown as including the first authentication source 120, the second authentication source 122, the first seal 121, the second seal 123, a retainer 125, a light source seal 127, the escutcheon 124, the light source 126, the PCBA 150, a mounting plate seal 128, and the mounting plate 132.

The first seal 121 and the second seal 123 allow the first authentication source 120 to remain sealed under operational conditions. In some examples, the first authentication source 120 regularly receives a force (e.g., ounces of force from a light finger press) from a user interacting with the first authentication source 120. Additionally, the first and second seals 121, 123 are configured to seal the first authentication source 120 when excessive force (e.g., pounds of force) is received at the first authentication source 120. Such a configuration allows for a robust construction of the electronic lock 100, specifically one that is able to withstand a variety of operating conditions.

As noted above, the first seal 121 is positioned between the first authentication source 120 and the escutcheon 124. In some examples, the first seal 121 is a rubber o-ring that is sized and shaped to mate with a groove 129 on a first side 131 of the first authentication source 120. In some examples, when the electronic lock 100 is assembled, the first seal 121 is compressed between the first authentication source 120 and the escutcheon 124.

The second seal 123 is positioned between the first authentication source 120 and the retainer 125. In some examples, the second seal 123 is connected to the retainer 125 by way of a fastener, such as a screw, adhesive, or the like. In some examples, the second seal 123 includes an aperture 135 configured to be positioned around the second authentication source 122. In some examples, the second seal 123 is positioned immediately adjacent a second side 133 of the first authentication source 120. In some examples, the second seal 123 is adjacent the entire second side 133 of the first authentication source 120. In some examples, the second seal 123 is adjacent to less than the entire second side 133 of first authentication source 120.

In some examples, the second seal 123 is constructed of a foam material and at least partially compressible and elastic. During operation of the electronic lock 100, when a force is received at the first side 131 of the first authentication source 120, the second seal 123 is configured to be compressed against the retainer 125 to absorb the force. Such absorption cushions the first authentication source 120 to reduce contact against another rigid surface that might damage the first authentication source 120. Additionally, the second seal 123 provides a dynamic cushion for the first authentication source 120 to be able to withstand a variety of different forces received at the first side 131. In some examples, because the second seal 123 has elastic qualities and the seal decompresses when the force is removed from the first side 131 of the first authentication source 120, the second seal 123 maintains contact with the first authentication source 120 to aid in maintaining a seal surrounding the second side 133 of the first authentication source 120. Additionally, as the second seal 123 is decompressed, the second seal 123 aids in moving the first authentication source 120 to a neutral position.

The retainer 125 is positioned between the second seal 123 and the light source 126. The retainer 125 is configured to aid is positioning the first authentication source 120 against the escutcheon 124. Specifically, the retainer 125 is configured to be attached to the escutcheon via fasteners 137, thus capturing the second seal 123, the first authentication source 120, and the first seal 121 between the retainer 125 and the escutcheon 124. In some examples, the retainer 125 is constructed of a rigid material, such as a plastic.

Figure 20:
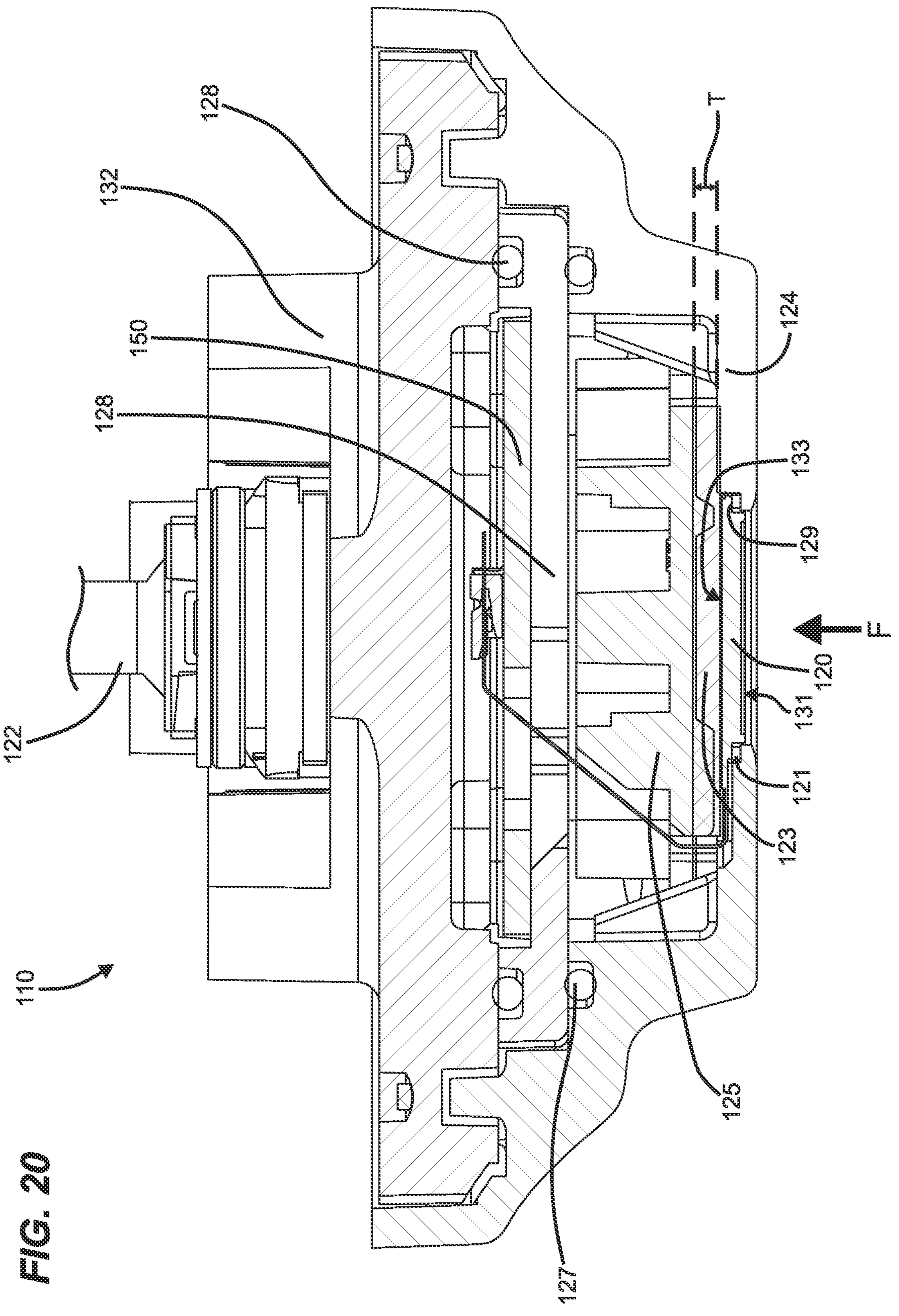
FIG. 20 is a section view along line 20-20 of the electronic lock in FIG. 17.
Figure 21:
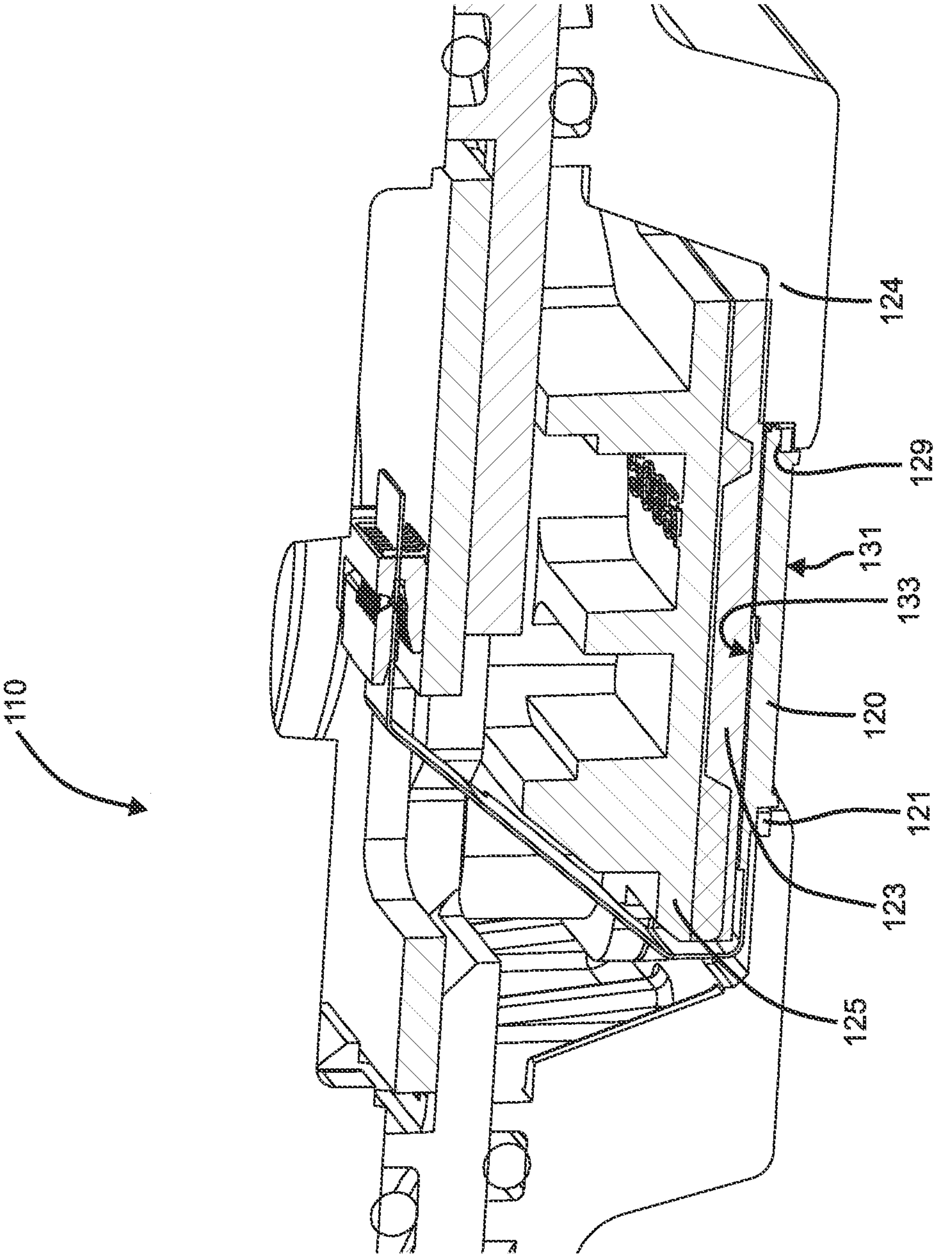
FIG. 21 is a perspective section view of the electronic lock of FIG. 20.

FIGS. 20 and 21 show sectional views of the electronic lock 100 along line 20-20 in FIG. 17. When assembled, the mounting plate 132 is positioned adjacent the light source 126 with the mounting plate seal 128 positioned therebetween. Additionally, the PCBA 150 is also positioned between the mounting plate 132 and the light source 126. The light source 126 is further positioned adjacent the retainer 125 and against a portion of the escutcheon 124. The light source seal 127 is positioned between the light source 126 and escutcheon 124. The retainer 125 is positioned adjacent the second seal 123 and the second seal 123 is positioned adjacent the first authentication source 120. Finally, the first seal 121 is positioned between the first authentication source 120 and the escutcheon 124.

As shown, the first seal 121 is positioned within the groove 129 of the first authentication source 120. In some examples, the first seal 121 is compressed between the groove 129 and the escutcheon 124 at the first side 131 of the first authentication seal 120.

The second seal 123 is positioned at the second side 133 of the first authentication source 120. Specifically, the second seal 123 is positioned between the retainer 125 and the first authentication source 120. A thickness T of the second seal 123 can fluctuate when a force F is received at the first side 131 of the first authentication source 120. For example, when receiving the force F, the thickness T of the second seal 123 is less than when the force F is removed. This is partly due the elastic nature of the second seal 123. In some examples, the second seal 123 is an elastic foam seal so that when the force F is received at the first side 131 of the first authentication source 120, the second seal 123 is compressed a maximum distance so that the first seal 121 remains positioned in contact with the first authentication source 120 and the escutcheon 124. Thus, a seal is maintained around the first side 131 of the first authentication source 120 even when the second seal 123 is compressed by the force F. Further, because the second seal 123 compresses and cushions the movements of the first authentication source 120, potential damage to the first authentication source 120 is reduced.

Figure 22:
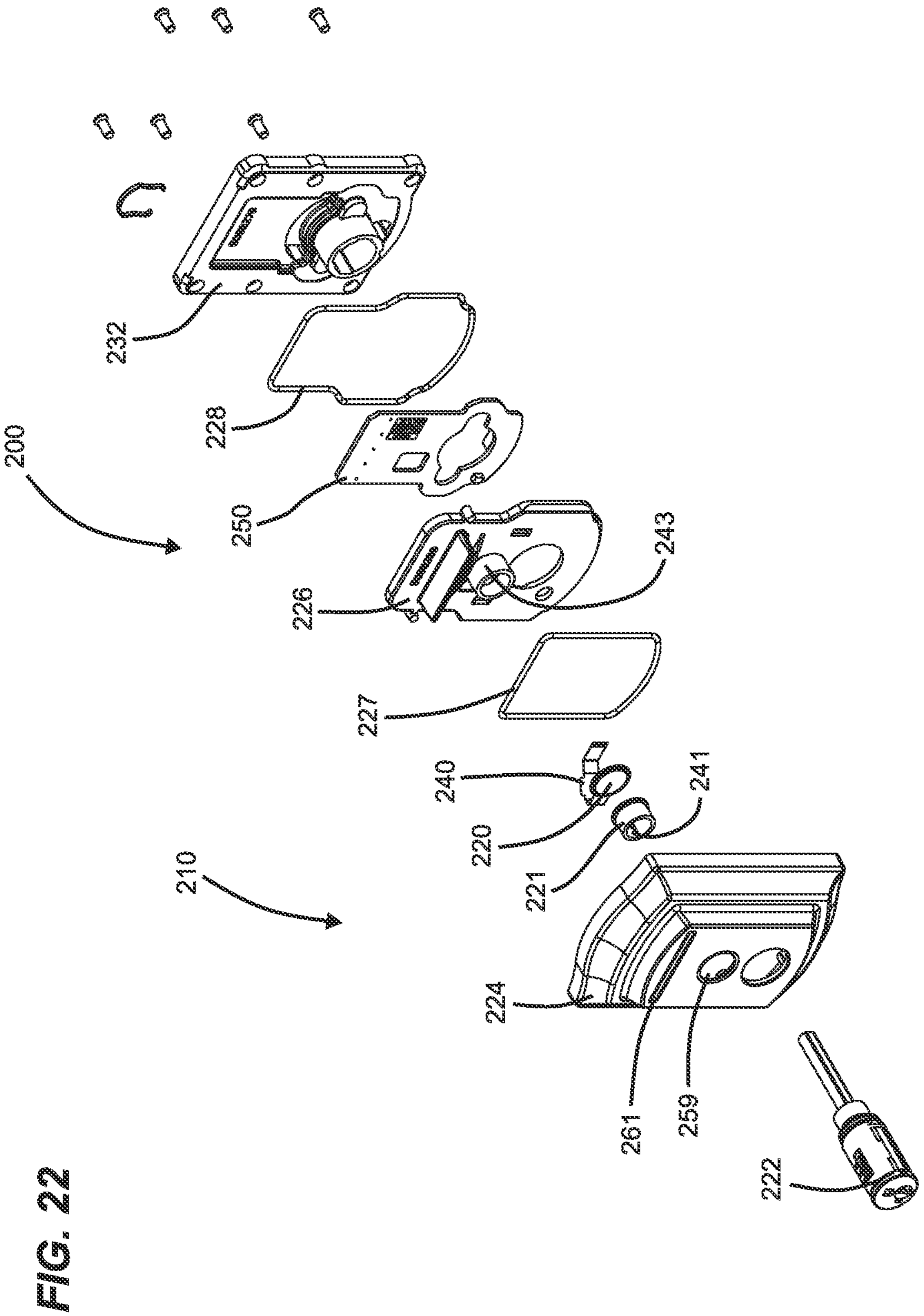
FIG. 22 is a front perspective exploded view of an exterior assembly of an electronic lock, according to one example of the present disclosure.

FIG. 22 shows an exploded view of an electronic lock 200, specifically an exterior assembly 210. The electronic lock 200 and exterior assembly 210 are substantially similar to the electronic lock 100 and exterior assembly 110 described above. The exterior assembly 210 is shown as including a first authentication source 220, a second authentication source 222, a first seal 221, a light source seal 227, an escutcheon 224, a light source 226, a PCBA 250, a mounting plate seal 228, and a mounting plate 232.

The first seal 221 is configured to display light transferred from the light source 226. In some examples, the first seal 221 is constructed of a semi-rigid transparent material. In some examples, the first seal 221 is elastic. In the depicted example, the first seal 221 has a hollow cylindrical construction. In some examples, the first seal 221 includes an opening 241 that allows the first authentication source 220 to be positioned therein. The opening 241 also allows electronic connections 240 (i.e., wires, ribbon, etc.) associated with the first authentication source 220 to pass out of the first seal 221 so they can be routed to the PCBA 250.

The escutcheon 224 includes a first light source aperture 259 and a second light source aperture 261, substantially similar to the escutcheon 124 described above. In some examples, the first light source aperture 259 is circular and the second light source aperture 261 is rectangular. In some examples, when assembled, the first authentication source 220 and the first seal 221 are positioned in the first light source aperture 259 of the escutcheon 224. In some examples, when assembled, a portion of the light source 226 is positioned in the second light source aperture 261.

The light source 226 is configured to aid is positioning and retaining the first authentication source 220 against the escutcheon 224. Specifically, the light source 226 includes an extension 243 that is configured to be positioned immediately adjacent the first authentication source 220. In addition, the first seal 221 is configured to be positioned at least partially surrounding the extension 243 allowing light to be transferred from the extension 243 to the first seal 221.

Figure 23:
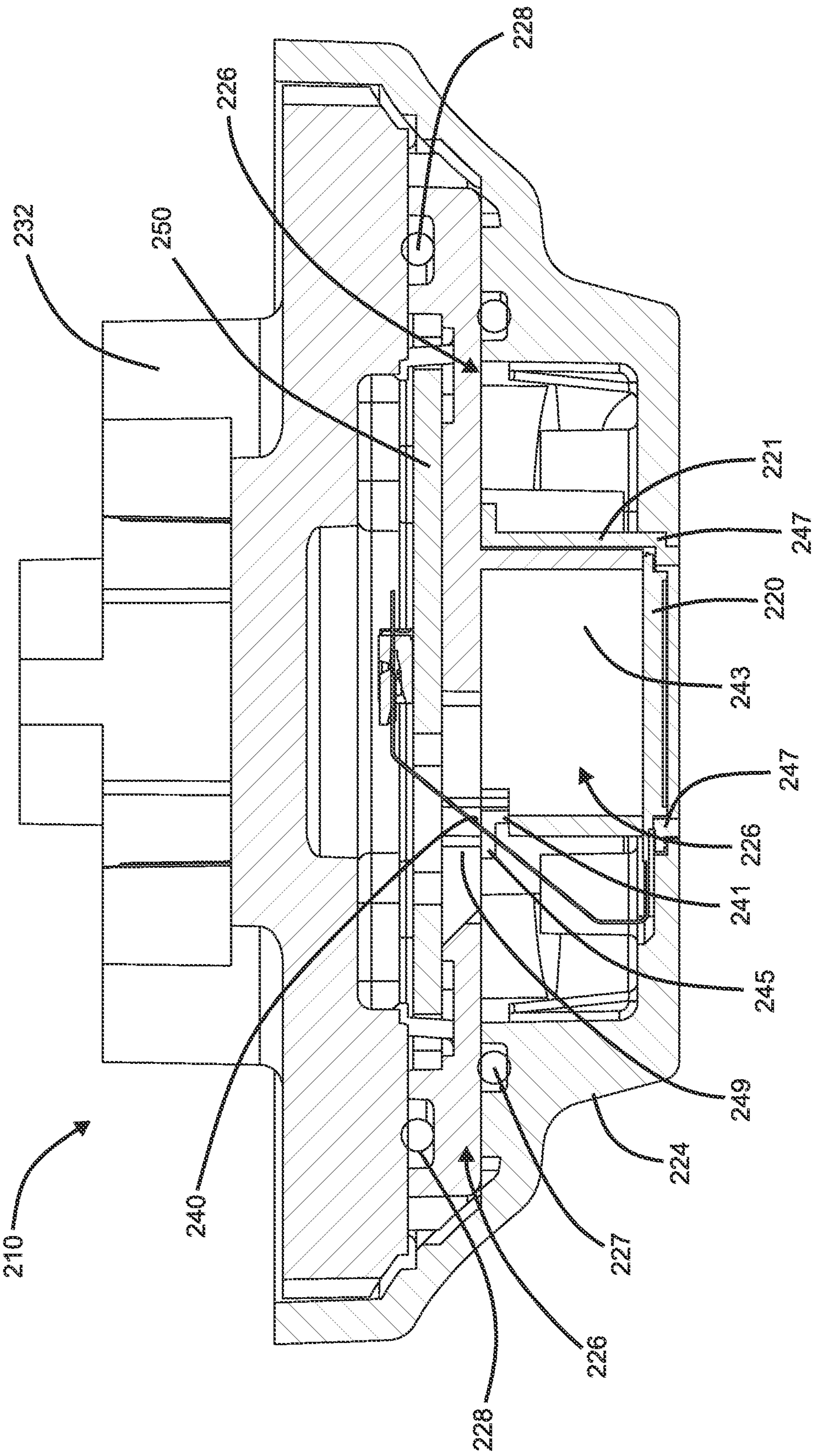
FIG. 23 is a section view of the electronic lock of FIG. 22.
Figure 24:
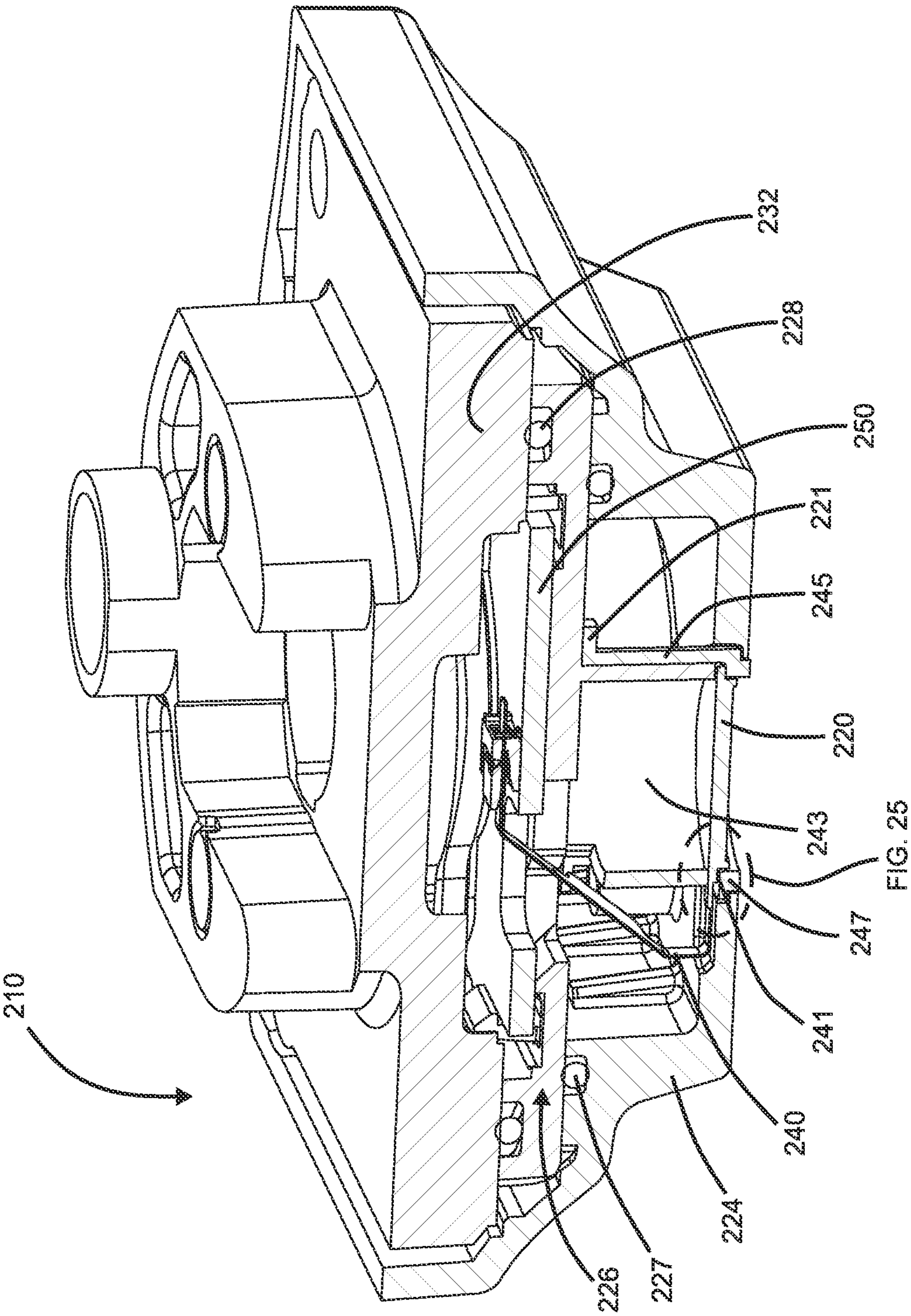
FIG. 24 is a perspective section view of the electronic lock of FIG. 20.

FIGS. 23 and 24 show sectional views of the electronic lock 200. When assembled, the mounting plate 228 is positioned adjacent the light source 226 with the mounting plate seal 228 positioned therebetween. Additionally, the PCBA 250 is also positioned between the mounting plate 232 and the light source 226. The light source 226 is further positioned adjacent the first seal 221 and against a portion of the first authentication source 220. The light source seal 227 is positioned between the light source 226 and the escutcheon 224. The first authentication source 220 is positioned between the light source 226 and the first seal 221. Finally, the first seal 221 is positioned between the first authentication source 220 and the escutcheon 224 and against, and partially around a portion of, the light source 226.

The first authentication source 220 is positioned within the first seal 221 and adjacent the extension 243 of the light source 226. As noted above, the opening 241 allows the electronic connections 240 associated with the first authentication source 220 to pass out of the first seal 221 so they can be routed to the PCBA 250.

The first seal 221 is positioned around the extension 243. In some examples, the first seal 221 includes a rear flange 245 and a front flange 247. When assembled, the rear flange 245 is positioned against a light source main body 249, at a base of the extension 243, and the front flange 247 is positioned against the escutcheon 224.

Figure 25:
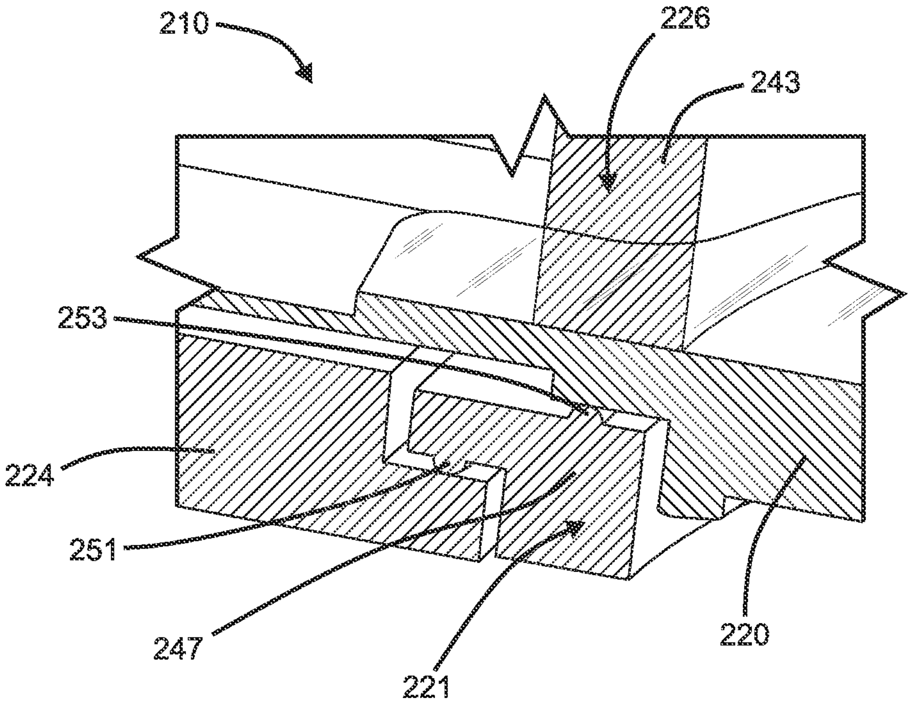
FIG. 25 is another perspective section view of the electronic lock of FIG. 20.

As shown in FIG. 25, the front flange 247 of the first seal 221 includes an escutcheon crush rib 251 and a first authentication source crush rib 253. The crush ribs 251, 253 are configured to maintain a seal between the escutcheon 224 and the first authentication source 220. In some examples, the escutcheon crush rib 251 and the first authentication source crush rib 253 are partially compressed when no force is received at the first authentication source 220. Because of the elastic nature of the first seal 221, a seal is maintained between the escutcheon 224 and the first authentication source 220 even when the first authentication source 220 is partially moved when a force is received at the first authentication source 220. This is due to the fact that crush ribs 251, 253 maintain contact with the escutcheon 224 and the first authentication source 220, even when under force.

Figure 26:
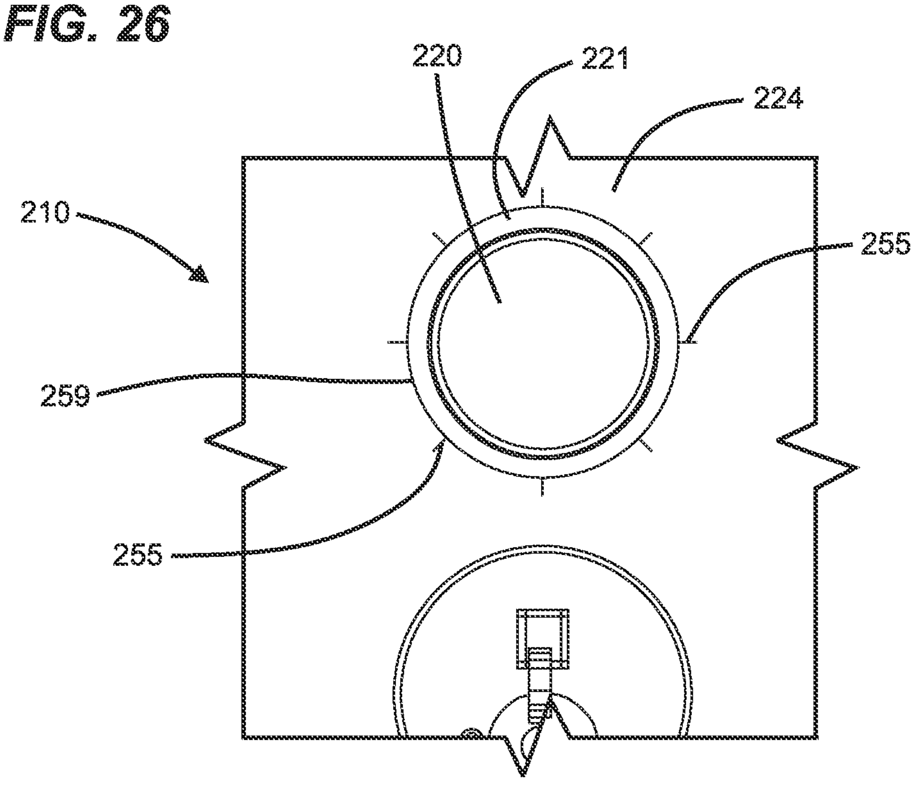
FIG. 26 is a front view of a portion of the electronic lock of FIG. 20.

FIG. 26 shows a front view of a portion of the exterior assembly 210. As shown, the first seal 221 is visible via the light source aperture 259 in the escutcheon 224 from the front of the exterior assembly 210 between the first authentication source 220 and the escutcheon 224. In some examples, the light source aperture 259 includes the first authentication source 220. In some examples, the light source aperture 259 is at least partially circular. In some examples, the light source aperture 259 is at least partially rectangular.

In some examples, the first seal 221 at least partially surrounds the first authentication source 220. In some examples, the first seal 221 completely surrounds the first authentication source 220. In some examples, the first seal 221 can display light 255 (shown schematically) from the light source 226, specifically, transferred from the extension 243 of the light source 226. In some examples, the first seal 221 can display light 255 in a ring shape from the light source 226. Specifically, by displaying light, the first seal 221 not only seals the first authentication source 220 and the escutcheon 224, but it can also display a plurality of responses or signals to the user and/or communicate various messages to the user to indicate an operational status of the electronic lock 200. Further, by displaying light 255 adjacent the first authentication source 220, the user can be guided to the first authentication source 220 in a low-light situation. In some examples, the electronic lock 200 can automatically illuminate the first seal 221 as a user is approaching and/or is near the electronic lock 200. In some examples, the electronic lock 200 can automatically illuminate the first seal 221 utilizing a motion sensor to sense when a user is near the electronic lock 200. In some examples, the electronic lock 200 can automatically illuminate the first seal 221 utilizing a user's mobile device location. In some examples, the electronic lock 200 can automatically illuminate the first seal 221 utilizing a connection with a user's mobile device.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An electronic lock comprising:

an exterior assembly and an interior assembly; and a wiring harness connectable to the exterior and interior assemblies to allow communication therebetween, the wiring harness including an exterior connector having an enlarged end flange and a seal positioned against the enlarged end flange of the exterior connector;

the exterior assembly including:

a wiring harness electrical receptacle configured to connect to the exterior connector of the wiring harness and having a first orientation;

a wiring harness receiving port coaxially aligned with the wiring harness electrical receptacle, the wiring harness receiving port including:

a first portion sized and shaped to position the seal of the wiring harness between walls of the first portion and the wiring harness; and a second portion having port barriers sized and shaped to allow for the exterior connector of the wiring harness to pass completely through the port barriers when the exterior connector of the wiring harness is in a second orientation with sides of the enlarged end flange of the exterior connector rotationally aligned with the port barriers, the second orientation being rotationally different from the first orientation, wherein the port barriers of the second portion limit axial movement of the exterior connector of the wiring harness through the port barriers when captured within the second portion and the exterior connector of the wiring harness is in the first orientation with the sides of the enlarged flange end of the exterior connector rotationally misaligned with the port barriers.

2. The electronic lock of claim 1, wherein the interior assembly includes a power source and a processor.

3. The electronic lock of claim 1, wherein the wiring harness receiving port is defined by a mounting plate positionable within the exterior assembly.

4. The electronic lock of claim 1, wherein the exterior assembly includes a biometric sensor.

5. The electronic lock of claim 1, wherein the exterior assembly and the interior assembly are mechanically connected to a bolt, wherein the exterior assembly and the interior assembly are configured to actuate the bolt between an extended position and a retracted position.

6. The electronic lock of claim 1, wherein the wiring harness receiving port is defined in a main body of a mounting plate.

7. The electronic lock of claim 6, wherein the main body is configured to be positioned around a mechanical lock.

8. The electronic lock of claim 1, wherein the first and second portions are immediately adjacent one another.

9. The electronic lock of claim 1, wherein the second portion defines a rectangular opening that defines the port barriers to limit axial movement of the wiring harness therethrough.

10. An electronic lock comprising:

a wiring harness including a connector having an enlarged end flange; and a mounting plate comprising:

a main body;

a wiring harness electrical receptacle configured to connect to the connector of the wiring harness, the wiring harness electrical receptacle having a first rotational orientation;

a wiring harness receiving port defined in the main body and axially aligned with the wiring harness electrical receptacle, the wiring harness receiving port including:

a first portion sized and shaped to seal around the wiring harness; and a second portion sized and shaped to selectively capture the connector within the wiring harness receiving port and axially limit movement of the wiring harness therein, wherein the second portion has port barriers orientated at a second rotational orientation different than the first rotational orientation of the wiring harness electrical receptacle such that during insertion of the connector into the wiring harness receiving port, sides of the enlarged end flange of the connector are aligned with the second rotational orientation to pass entirely through the port barriers and then are aligned with the first rotational orientation to connect to the wiring harness electrical receptacle, and wherein when the connector is aligned with the first rotation orientation, the sides of the enlarged end flange of the connector are misaligned with the port barriers to prevent the connector from axially moving back out of the wiring harness receiving port.

11. The electronic lock of claim 10, wherein the first and second portions are immediately adjacent one another.

12. The electronic lock of claim 10, wherein the main body is configured to be positioned around a mechanical lock.

13. The electronic lock of claim 10, wherein the main body is configured to mate with at least one aesthetic escutcheon.

14. The electronic lock of claim 10, wherein the second portion defines a rectangular opening that limits axial movement of the wiring harness therethrough.

15. The electronic lock of claim 10, wherein the mounting plate is positioned within an exterior assembly of the electronic lock, wherein the wiring harness is connectable to the exterior assembly and an interior assembly to allow communication therebetween, the wiring harness including a seal positioned in the first portion of the wiring harness receiving port.

16. The electronic lock of claim 15, wherein the exterior assembly includes a biometric sensor.

17. The electronic lock of claim 15, wherein the first portion is sized and shaped to position the seal of the wiring harness between walls of the first portion and the wiring harness.

18. An electronic lock comprising:

an exterior assembly being configured to be positioned at an exterior of a door;

an interior assembly having a power source and a processor;

a bolt movable between an extended position and a retracted position, wherein the exterior and interior assemblies are connected to, and capable of actuating, the bolt; and a wiring harness connectable to the exterior and interior assemblies to allow communication therebetween, the wiring harness including a connector and a seal, the connector having an enlarged end flange and the seal is positioned against the enlarged end flange;

the exterior assembly including:

a first authentication source to selectively actuate the bolt, wherein the first authentication source is a biometric fingerprint sensor, the biometric fingerprint sensor being connected to the processor of the interior assembly via the wiring harness to selectively actuate the bolt when a valid credential is received at the biometric fingerprint sensor;

a second authentication source, the second authentication source being at least one of a mechanical lock, a keypad, a touch surface, and a NFC reader;

a wiring harness electrical receptacle defining an insertion axis and having a first rotational orientation relative to the insertion axis, the wiring harness electrical receptacle configured to connect to the connector; and a wiring harness receiving port coaxially aligned with the wiring harness electrical receptacle along the insertion axis, the wiring harness receiving port including:

a first portion sized and shaped to position the seal of the wiring harness between walls of the first portion and the wiring harness; and a second portion having port barriers at a second rotational orientation relative to the insertion axis, the second rotational orientation different than the first rotational orientation, the port barriers selectively allowing for the connector to pass entirely through when sides of the enlarged end flange of the connector are in the second rotational orientation, and wherein once the connector is disposed within the second portion, the port barriers of the second portion limit axial movement of the connector out of the second portion when the sides of the enlarged end flange of the connector are misaligned from the second rotational orientation.

19. The electronic lock of claim 18, wherein the second portion defines a rectangular opening that defines the port barriers to limit axial movement of the wiring harness therethrough.

* * * * *